(12) United States Patent
Reed

(10) Patent No.: US 8,508,137 B2
(45) Date of Patent: Aug. 13, 2013

(54) APPARATUS AND METHOD OF ENERGY EFFICIENT ILLUMINATION

(75) Inventor: William G. Reed, Seattle, WA (US)

(73) Assignee: Express Imaging Systems, LLC, Seattle, WA (US)

( * ) Notice: Subject to any disclaimer, the term of this patent is extended or adjusted under 35 U.S.C. 154(b) by 561 days.

(21) Appl. No.: 12/784,093

(22) Filed: May 20, 2010

(65) Prior Publication Data

US 2010/0295455 A1 Nov. 25, 2010

Related U.S. Application Data

(60) Provisional application No. 61/180,017, filed on May 20, 2009, provisional application No. 61/333,983, filed on May 12, 2010, provisional application No. 61/346,263, filed on May 19, 2010.

(51) Int. Cl.
| | |
|---|---|
| H05B 39/04 | (2006.01) |
| H05B 37/02 | (2006.01) |
| H05B 41/36 | (2006.01) |
| F21V 23/04 | (2006.01) |

(52) U.S. Cl.
USPC .......................................... 315/152; 362/276

(58) Field of Classification Search
USPC ................................... 368/11, 205
See application file for complete search history.

(56) References Cited

U.S. PATENT DOCUMENTS

| | | | |
|---|---|---|---|
| 4,153,927 A | 5/1979 | Owens | |
| 4,237,377 A * | 12/1980 | Sansum | 250/214 R |
| 5,086,379 A | 2/1992 | Denison et al. | |
| 5,160,202 A | 11/1992 | Légaré | 362/153.1 |
| 5,230,556 A | 7/1993 | Canty et al. | |
| 5,343,121 A | 8/1994 | Terman et al. | 315/158 |
| 5,349,505 A | 9/1994 | Poppenheimer | |
| 5,450,302 A * | 9/1995 | Maase et al. | 362/276 |

(Continued)

FOREIGN PATENT DOCUMENTS

| | | |
|---|---|---|
| DE | 40 01 980 | 8/1990 |
| EP | 1 734 795 | 12/2006 |

(Continued)

OTHER PUBLICATIONS

Reed et al., "Low-Profile Pathway Illumination System," U.S. Appl. No. 61/051,619, filed May 8, 2008, 25 pages.

(Continued)

*Primary Examiner* — Douglas W Owens
*Assistant Examiner* — Dedei K Hammond
(74) *Attorney, Agent, or Firm* — Seed IP Law Group PLLC

(57) ABSTRACT

An illumination system correlates solar time to a clock and controls lighting or illumination based on time. The illumination system may turn ON light source(s) at a first level at a turn ON time, correlated to be around or at dusk, and turn OFF light source(s) at a turn OFF time, correlated to be around or at dawn. The illumination system may reduce a level of light output, and hence power consumption, at a time after turning ON a light source, and increases the level of light output at a time prior to turning OFF the light source. Turn ON, turn OFF, decrease and increase times may be determined based on recent levels of light or illumination in the environment, for example via average or median levels over a number of previous daily cycles. Filtering may eliminate aberrant events.

26 Claims, 12 Drawing Sheets

(56) References Cited

U.S. PATENT DOCUMENTS

| | | | |
|---|---|---|---|
| 5,589,741 A | 12/1996 | Terman et al. | 315/360 |
| 6,111,739 A | 8/2000 | Wu et al. | 361/106 |
| 6,612,720 B1 | 9/2003 | Beadle | |
| 6,753,842 B1 | 6/2004 | Williams et al. | |
| 6,902,292 B2 | 6/2005 | Lai | |
| 7,066,622 B2 | 6/2006 | Alessio | |
| 7,122,976 B1 | 10/2006 | Null et al. | 315/362 |
| 7,188,967 B2 | 3/2007 | Dalton et al. | |
| 7,239,087 B2 | 7/2007 | Ball | 315/128 |
| 7,281,820 B2 | 10/2007 | Bayat et al. | |
| 7,317,403 B2 | 1/2008 | Grootes et al. | 340/815.45 |
| 7,339,323 B2 | 3/2008 | Bucur | 315/128 |
| 7,339,471 B1 | 3/2008 | Chan et al. | 340/541 |
| 7,405,524 B2 | 7/2008 | Null et al. | |
| 7,578,596 B2 | 8/2009 | Martin | |
| 7,688,222 B2 | 3/2010 | Peddie et al. | |
| 7,703,951 B2 | 4/2010 | Piepgras et al. | |
| 7,804,200 B2 | 9/2010 | Flaherty | |
| 7,834,922 B2 | 11/2010 | Kurane | |
| 7,940,191 B2 | 5/2011 | Hierzer | |
| 2002/0113192 A1 | 8/2002 | Antila | |
| 2004/0095772 A1 | 5/2004 | Hoover et al. | 362/363 |
| 2004/0105264 A1 | 6/2004 | Spero | 362/276 |
| 2004/0120148 A1 | 6/2004 | Morris et al. | 362/264 |
| 2004/0201992 A1 | 10/2004 | Dalton et al. | |
| 2005/0099802 A1 | 5/2005 | Lai | |
| 2005/0135101 A1 | 6/2005 | Richmond | 362/276 |
| 2005/0174780 A1 | 8/2005 | Park | 362/294 |
| 2005/0243022 A1 | 11/2005 | Negru | 345/46 |
| 2005/0254015 A1 | 11/2005 | Engle et al. | 353/52 |
| 2006/0001384 A1 | 1/2006 | Tain et al. | 315/246 |
| 2006/0014118 A1 | 1/2006 | Utama | 433/31 |
| 2006/0034075 A1 | 2/2006 | Alessio | |
| 2006/0053459 A1 | 3/2006 | Simerly et al. | |
| 2006/0158130 A1 | 7/2006 | Furukawa | 315/200 R |
| 2006/0202914 A1 | 9/2006 | Ashdown | 345/46 |
| 2006/0262544 A1 | 11/2006 | Piepgras et al. | |
| 2006/0277823 A1 | 12/2006 | Barnett et al. | 47/33 |
| 2007/0096118 A1 | 5/2007 | Mahalingam et al. | 257/81 |
| 2007/0102033 A1 | 5/2007 | Petrocy | 136/203 |
| 2007/0159819 A1 | 7/2007 | Bayat et al. | |
| 2007/0247853 A1 | 10/2007 | Dorogi | 362/294 |
| 2007/0279921 A1 | 12/2007 | Alexander et al. | 362/368 |
| 2008/0043106 A1 | 2/2008 | Hassapis et al. | |
| 2008/0130304 A1 | 6/2008 | Rash et al. | |
| 2008/0266839 A1 | 10/2008 | Claypool et al. | |
| 2008/0271065 A1 | 10/2008 | Buonasera et al. | 725/10 |
| 2008/0291661 A1 | 11/2008 | Martin | |
| 2009/0161356 A1 | 6/2009 | Negley et al. | |
| 2009/0278474 A1 | 11/2009 | Reed et al. | 315/294 |
| 2009/0278479 A1 | 11/2009 | Platner et al. | |
| 2009/0284155 A1 | 11/2009 | Reed et al. | |
| 2010/0060130 A1 | 3/2010 | Li | 313/46 |
| 2010/0090577 A1 | 4/2010 | Reed et al. | 313/46 |
| 2010/0123403 A1 | 5/2010 | Reed | 315/193 |
| 2010/0277082 A1 | 11/2010 | Reed et al. | 315/159 |
| 2010/0295454 A1 | 11/2010 | Reed | 315/152 |
| 2010/0295946 A1 | 11/2010 | Reed et al. | 348/164 |
| 2011/0001626 A1 | 1/2011 | Yip et al. | |
| 2011/0026264 A1 | 2/2011 | Reed et al. | |
| 2011/0175518 A1 | 7/2011 | Reed et al. | |
| 2011/0310605 A1 | 12/2011 | Renn et al. | |

FOREIGN PATENT DOCUMENTS

| | | |
|---|---|---|
| FR | 2 883 306 | 9/2006 |
| JP | 2001-333420 | 11/2001 |
| JP | 2004/349065 | 12/2004 |
| JP | 2006/244711 | 9/2006 |
| WO | 02/076068 | 9/2002 |
| WO | 03/056882 | 7/2003 |
| WO | 2006/057866 | 6/2006 |
| WO | 2007/036873 | 4/2007 |
| WO | 2008/030450 | 3/2008 |
| WO | 2009/040703 | 4/2009 |

OTHER PUBLICATIONS

Reed et al., "Gas-Discharge Lamp Replacement," U.S. Appl. No. 61/052,924, filed May 13, 2008, 32 pages.
Reed et al., "Turbulent Flow Cooling for Electronic Ballast," U.S. Appl. No. 61/088,651, filed Aug. 13, 2008, 23 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed et al., "Gas-Discharge Lamp Replacement with Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Electrically Isolated Heat Sink for Solid-State Light," U.S. Appl. No. 61/229,435, filed Jul. 29, 2009, 29 pages.
Reed et al., "Apparatus, Method to Change Light Source Color Temperature with Reduced Optical Filtering Losses," U.S. Appl. No. 61/295,519, filed Jan. 15, 2010, 35 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Renn et al., "Solid State Lighting Device and Method Employing Heat Exchanger Thermally Coupled Circuit Board," U.S. Appl. No. 61/357,421, filed Jun. 22, 2010, 49 pages.
International Search Report, mailed Jul. 9, 2009 for PCT/US2009/043171, 3 pages.
Written Opinion, mailed Jul. 9, 2009 for PCT/US2009/043171, 8 pages.
International Search Report, mailed Jun. 21, 2010 for PCT/US2009/064625, 3 pages.
Written Opinion, mailed Jun. 21, 2010 for PCT/US2009/064625, 5 pages.
International Search Report, mailed Dec. 13, 2010 for PCT/US2010/035649, 3 pages.
Written Opinion, mailed Dec. 13, 2010 for PCT/US2010/035649, 4 pages.
International Search Report, mailed Dec. 15, 2010 for PCT/US2010/035658, 3 pages.
Written Opinion, mailed Dec. 15, 2010 for PCT/US2010/035658, 3 pages.
"LCD Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr..., 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
International Search Report, mailed Dec. 28, 2010 for PCT/US2010/035651, 3 pages.
International Search Report, mailed Oct. 8, 2012 for PCT/US2012/033059, 3 pages.
Littelfuse, "Application Note: Protecting LEDs in Product Designs," 2009, 2 pages.
Panasonic Electronic Components, "LED Lighting Solutions," 2009, 6 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.

Reed et al., "Low-Profile Pathway Illumination System," Notice of Allowance, dated Oct. 14, 2011, for U.S. Appl. No. 12/437,472, 9 pages.

Reed et al., "Apparatus, Method to Change Light Source Color Temperature With Reduced Optical Filtering Losses," U.S. Appl. No. 61/406,490, filed Oct. 25, 2010, 46 pages.

Reed, "Apparatus and Method of Energy Efficient Illumination Using Received Signals," U.S. Appl. No. 13/085,301, filed Apr. 12, 2011, 99 pages.

Reed, "Electrostatic Discharge Protection for Luminaire," U.S. Appl. No. 13/212,074, filed Aug. 17, 2011, 30 pages.

Reed, "Resonant Network for Reduction of Flicker Perception in Solid State Lighting Systems," U.S. Appl. No. 61/527,029, filed Aug. 24, 2011, 41 pages.

Reed et al., "Systems and Methods That Employ Object Recognition," U.S. Appl. No. 13/411,321, filed Mar. 2, 2012, 51 pages.

Renesas Electronics, "Zener Diodes for Surge Absorption—Applications of high-intensity LED," Apr. 2010, 1 page.

Tyco Electronics, "Circuit Protection," retrieved Jun. 10, 2011, retrieved from http://www.tycoelectronics.com/en/products/circuit-protection.html, 2 pages.

Written Opinion, mailed Dec. 28, 2010 for PCT/US2010/035651, 3 pages.

Written Opinion, mailed Oct. 8, 2012 for PCT/US2012/033059, 3 pages.

* cited by examiner

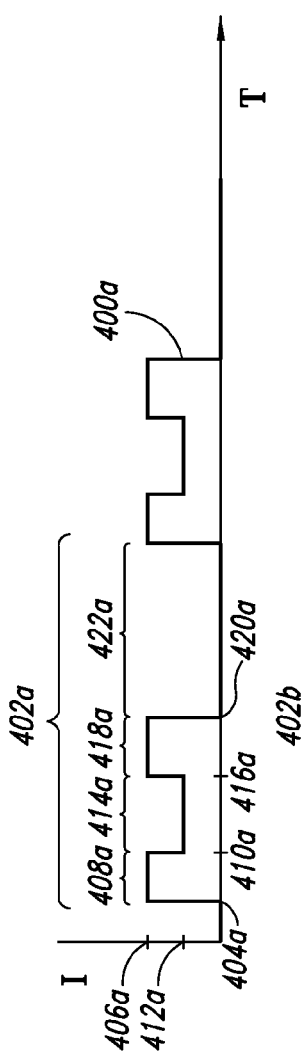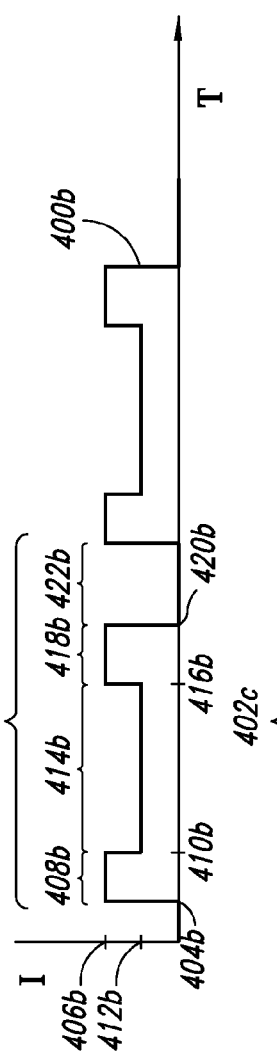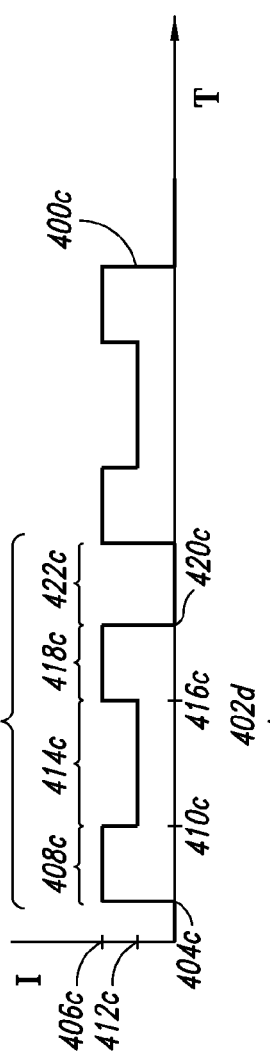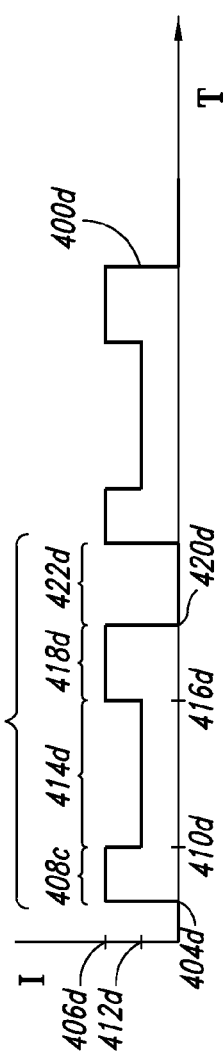

APPARATUS AND METHOD OF ENERGY EFFICIENT ILLUMINATION

CROSS-REFERENCE TO RELATED APPLICATIONS

This application claims benefit under 35 U.S.C. 119(e) to U.S. Provisional Patent Application Ser. No. 61/180,017, filed May 20, 2009, U.S. Provisional Patent Application Ser. No. 61/333,983, filed May 12, 2010, and U.S. Provisional Patent Application Ser. No. 61/346,263, filed May 19, 2010.

BACKGROUND

1. Technical Field

The present disclosure generally relates to the field of illumination devices and, more particularly, to control of illumination to improve energy efficiency.

2. Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, florescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with florescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, florescent light sources take a relatively long time after being turned ON to achieve their full rated level of output light or illumination. Such light sources also typically have a high energy consumption during warm-up. Many higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism. Automatic control mechanisms generally fall into two broad categories, timers and environmental sensors. Timer based control mechanisms turn light sources ON and OFF based on time. The times are typically user configurable. Such relies on the user to account for changes in length of daylight which may occur throughout a year. Very often, timer based control mechanisms are set once and never updated. Environmental sensor based control mechanisms sense light or illumination level and/or motion or proximity. Light or illumination level based control mechanisms are commonly referred to dusk-to-dawn sensors. Dusk-to-dawn light or illumination level based control mechanisms turn the light sources ON when a level of light or illumination in an environment falls below a turn ON threshold, and turn the light sources OFF when the level of light or illumination exceeds a turn OFF threshold. Light or illumination level based control mechanisms advantageously automatically accommodate changes in length of daylight throughout the year. However, such control mechanisms typically employ fixed turn ON and turn OFF thresholds (e.g., 10 Lux and 30 Lux, respectively). Since the particular application or location of the luminaire is not known, the manufacturer sets the turn ON and turn OFF thresholds to accommodate a wide range of conditions. Thus, the thresholds may be set too low for applications or locations with a high volume of artificial light. Likewise, thresholds may be set too high for applications or locations with no or relatively little artificial light. Such may cause the light source(s) to be turned ON prematurely or turned OFF later than would otherwise be possible, resulting in less efficiency than might otherwise be possible. Such may also cause the light source(s) to be turned ON late or turned OFF prematurely, failing to provide adequate light when needed. Even changes in natural ambient light may cause the thresholds to be incorrect. For example, snow may reflect sufficient light to prevent the light source(s) from being turned ON.

Motion or proximity based control mechanisms (e.g., passive infrared sensor based mechanisms) turn light sources ON when motion or proximity is detected. Motion or proximity based control mechanisms turn light sources OFF after some period of time if no motion or proximity is detected during that period of time. Sensitivity of such motion or proximity based control mechanisms is typically user configurable, as is the duration between turn ON and turn OFF. However, motion or proximity based control mechanisms have limited range (e.g., 10 meters), limiting the number of applications in which such may be effectively employed. Motion or proximity based control mechanisms may also be ineffective where the ambient air temperature or temperature of an object is close to that of the trigger temperature (e.g., temperature of human body). Some lighting control mechanisms employ both light or illumination level based and motion or proximity based techniques. Such lighting control mechanisms turn light sources ON only if motion is detected while the level of light or illumination in the environment is below the turn ON threshold. Thus, the motion or proximity sensing is active only between dusk and dawn.

Sometimes these approaches are incompatible with each other. For example, the relatively long time for high intensity discharge light sources to produce full output hinders the effective use of such light sources with motion or proximity based control mechanisms. Typically, high intensity discharge light sources cannot be dimmed. While some dimmable compact florescent light sources have recently become available, such exhibit poor power factors. Further, many control mechanisms are built into the luminaire. Such makes it difficult or even impossible to modify operation of the control mechanism beyond some simple user settings (e.g., sensitivity, duration between turn ON and turn OFF).

New approaches to improving the energy efficiency of lighting systems are desirable.

BRIEF SUMMARY

As previously explained, lighting systems which use dusk-to-dawn control mechanisms typically provide light at a continuous, relatively high, level from dusk to dawn. The exception to such appears to be when motion or proximity based sensing is included in such a control mechanism. In many instances, a high level of lighting or illumination is not necessary throughout the entire period. For instance, in retail business or corporate office parking lots high levels of light or illumination are typically only useful into the late evening hours (e.g., 10 PM or 11 PM) and early morning hours (e.g., 4 AM or 5 AM). High level lighting or illumination between the late evening and early morning hours provides little benefit. A lower level of light or illumination during such hours may achieve sufficient illumination for some desired purpose (e.g., security), while reducing energy consumption.

In contrast to conventional dusk-to-dawn photo control mechanism configured to turn the light source(s) 308 ON when the sensor 304 senses a level of illumination or light in the environment that is at or below a turn ON threshold, the control subsystem 312 may be configured to adjust lighting based on a time indicated by a clock, which operation is calibrated or coordinated with solar time as indicated by levels of light or illumination in the environment sensed by the sensor 304. Thus, the control subsystem may be configured to turn ON, turn OFF, reduce and/or increase the level of light or illumination at various times of a daily cycle as indicated by the clock, where such times are adjusted, calibrated or coordinated to accommodate changes in the solar day of the daily cycle.

Correlation with a solar day or cycle may be based on occurrence of certain events in the natural sinusoidal diurnal rhythm of the solar day or cycle. Such events may include times at which a maximum or minimum level of light or illumination occurs, which correspond to solar noon and solar midnight, respectively. Such events may additionally or alternatively includes times at which a rate of change in the level of light or illumination is at a maximum or a minimum, which may correspond to times of dusk and dawn. Such events may additionally or alternatively include times at which an inflection occurs in the sinusoidal cycle representing the level of illumination with respect to time. Correlation may take into account a direction of the sensed level of light or illumination, that is increasing or decreasing.

Adjustment, calibration or coordination may be based on multiple samples, for example, measurements of light or illumination levels in the environment taken over two or more daily cycles. Such may reduce or eliminate affects of aberrant conditions such as artificial light. Samples may be filtered based on magnitude of change, rate of change, or differences with respect to previous samples to eliminate affects of aberrant conditions.

A method of operating an illumination system may be summarized as including processing by at least one control subsystem information indicative of a number of levels of illumination in an environment sensed by at least one sensor at respective ones of a plurality of times during each of a plurality of daily cycles; the processing by the at least one control subsystem including: correlating at least one solar time with a clock of the control subsystem, the at least one solar time based at least in part on the information indicative of the level of illumination in the environment sensed by the at least one sensor; determining at least one illumination adjustment time with reference to the clock of the control subsystem at which to adjust a level of illumination produced by at least one illumination source during a current one of the plurality of daily cycles; and adjusting the level of illumination produced by the least one illumination source responsive to the occurrence of the determined at least one illumination adjustment time as indicated by the clock of the control subsystem.

Correlating at least one solar time with a clock of the control subsystem may include storing a number of values indicative of respective levels of illumination to at least one nonvolatile storage medium with a respective logical relationship to a respective time with reference to the clock. Correlating at least one solar time with a clock of the control subsystem may include determining a time with reference to the clock of an occurrence of at least one of a maximum level of illumination indicative of solar noon or a minimum level of illumination indicative of solar midnight over at least one previous one of the plurality of the daily cycles which occurred prior to a current one of the plurality of daily cycles. Correlating at least one solar time with a clock of the control subsystem may include determining at least one of a rate of change in the illumination levels and a direction of change in the illumination levels for each of the plurality of daily cycles.

Determining at least one illumination adjustment time with reference to the clock of the control subsystem may include determining at least one of a time of dusk or a time of dawn based at least in part on at least one level of illumination. Determining at least one illumination adjustment time with reference to the clock of the control subsystem may include determining at least one of a time of dusk or a time of dawn based on a percentage of at least one illumination level associated with an event in the daily cycle. The event in the daily cycle associated with the illumination level upon which the at least one of the time of dusk or the time of dawn is based may include at least one of a minimum illumination level, a maximum illumination level, a minimum rate of change in illumination level, a maximum rate of change of illumination level, a change in direction from increasing illumination level to decreasing illumination level or a change in direction from decreasing illumination level to increasing illumination level. Determining at least one illumination adjustment time with reference to the clock of the control subsystem may further include limiting a change in at least one of a time of dusk or time of dawn in a current one of the daily cycles from a determined time of dusk or time of dawn from at least one previous one of the daily cycles based at least in part on defined permitted value. The information indicative of the levels of illumination may be stored in at least one nonvolatile storage medium and determining at least one illumination adjustment time with reference to the clock of the control subsystem may include filtering out information corresponding to a short term event from the information based on at least one threshold value that specifies a minimum duration.

Adjusting a level of illumination may include at least one of: causing at least one illumination source to be turned ON at a first illumination level during a current one of the daily cycles; or causing at least one illumination source to be turned OFF during the current one of the daily cycles. Adjusting a level of illumination may include at least one of: causing a level of illumination produced by the at least one illumination source to be reduced from the first level to a non-zero level between the at least one illumination source being turned ON and OFF during the current one of the daily cycles; or causing the level of illumination produced by the at least one illumination source to be increased between the causing the level of illumination produced by the at least one illumination source to be reduced and the at least one illumination source being turned OFF during the current one of the daily cycles.

An illumination system may be summarized as including a control subsystem that includes at least one control circuit, the control subsystem communicatively coupled to receive information indicative of a number of levels of illumination in an environment sensed by at least one sensor at respective ones of a plurality of times during each of a plurality of daily cycles, and that: correlates at least one solar time with a clock of the control subsystem, the at least one solar time based at least in part on the information indicative of the level of illumination in the environment sensed by the at least one sensor; determines at least one illumination adjustment time with reference to the clock of the control subsystem at which to adjust a level of illumination produced by at least one illumination source during a current one of the plurality of daily cycles; and adjusts the level of illumination produced by the least one illumination source responsive to the occurrence of the determined at least one illumination adjustment time as indicated by the clock of the control subsystem.

The control subsystem may store a number of values indicative of respective levels of illumination to at least one nonvolatile storage medium with a respective logical relationship to a respective time with reference to the clock to correlate the at least one solar time with the clock. The control subsystem may determine a time with reference to the clock of an occurrence of at least one of a maximum level of illumination indicative of solar noon or a minimum level of illumination indicative of solar midnight over at least one previous one of the plurality of the daily cycles which occurred prior to a current one of the plurality of daily cycles to correlate the at least one solar time with the a clock. The control subsystem may determine at least one of a rate of change in the illumination levels and a direction of change in the illumination levels for each of the plurality of daily cycles to correlate the at least one solar time with the clock. The control subsystem may determine at least one of a time of dusk or a time of dawn based at least in part on at least one level of illumination to determine the at least one illumination adjustment time. The control subsystem may determine at least one of a time of dusk or a time of dawn based on a percentage of at least one illumination level associated with an event in the daily cycle to determine the at least one illumination adjustment time. The event in the daily cycle associated with the illumination level upon which the at least one of the time of dusk or the time of dawn is based may include at least one of a minimum illumination level, a maximum illumination level, a minimum rate of change in illumination level, a maximum rate of change of illumination level, a change in direction from increasing illumination level to decreasing illumination level or a change in direction from decreasing illumination level to increasing illumination level.

The control subsystem may further limit a change in at least one of a time of dusk or time of dawn in a current one of the daily cycles from a determined time of dusk or time of dawn from at least one previous one of the daily cycles based at least in part on defined permitted value to determine the at least one illumination adjustment time.

The control subsystem may further include at least one nonvolatile storage medium that stores the information indicative of the levels of illumination and the control subsystem may filter out information corresponding to a short term event from the information based on at least one threshold value that specifies a minimum duration to determine the at least one illumination adjustment time.

The control subsystem: may cause at least one illumination source to be turned ON at a first illumination level during a current one of the daily cycles; and may cause at least one illumination source to be turned OFF during the current one of the daily cycles, to adjust the level of illumination. The control subsystem: may cause a level of illumination produced by the at least one illumination source to be reduced from the first level to a non-zero level between the at least one illumination source being turned ON and OFF during the current one of the daily cycles; and may cause the level of illumination produced by the at least one illumination source to be increased between the causing the level of illumination produced by the at least one illumination source to be reduced and the at least one illumination source being turned OFF during the current one of the daily cycles, to adjust the level of illumination.

The control subsystem may further include an analog timer circuit that produces at least a first control signal at a first defined period following an occurrence of a first time as indicated by the clock of the control subsystem. Such may produce control signals to increase and/or decrease levels of light or illumination produced by the light source(s) at respective defined periods following occurrence of an ON time in the temporal reference frame of the clock. Such may additionally or alternatively produce control signals to turn OFF the light source(s) at a respective defined period following occurrence of an ON time in the temporal reference frame of the clock.

Thus, the illumination system and method may adjust illumination based on time of day, as correlated or adjusted for differences in the solar day which occur throughout the year and at different latitudes. Such may prevent the illumination system from being adversely affected by artificial light (e.g., automobiles, flashlights, retail lighting) or changes in natural lighting conditions (e.g., snow fall). Such may even prevent attempts to intentionally rendering a lighting system inoperative through the use of flashlights or other directed light sources. Such may also eliminate or reduce the need to aim a sensor of the control subsystem away from artificial light sources. Such may also allow control over an array of luminaires. For example, such may allow synchronous or near synchronous over multiple luminaires even where each may be subject to different, respective, environmental light levels. Such may prevent concerns regarding whether all luminaires are functioning correctly and thereby eliminate unnecessary service calls.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4A is a graph showing a level of illumination or output versus time over two daily cycles during a first part of a year, according to another non-limiting illustrated embodiment.

FIG. 4B is a graph showing a level of illumination or output versus time over two daily cycles during a second part of a year.

FIG. 4C is a graph showing a level of illumination or output versus time over two daily cycles during the second part of a year, according to another non-limiting illustrated embodiment where a length of time of high intensity illumination varies as a function of total time that the light source ON.

FIG. 4D is a graph showing a level of illumination or output versus time over two daily cycles during the second part of a year, according to another non-limiting illustrated embodiment where a length of time of high intensity immediately following turn ON is different from a length of time of high intensity immediately preceding turn OFF of the light source.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires and imaging devices have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
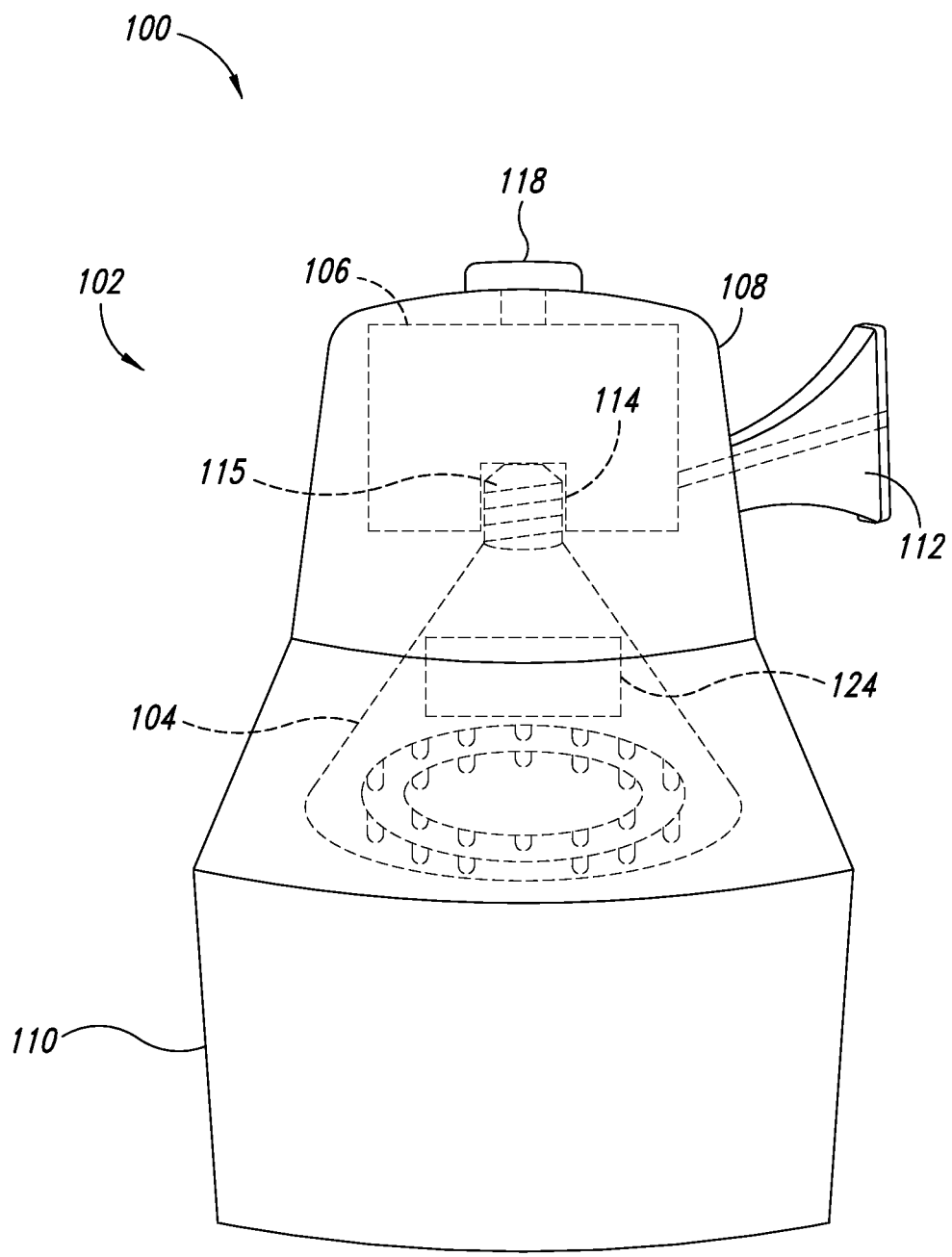
FIG. 1 is an isometric diagram showing a luminaire including a control subsystem and a light source, according to one non-limiting illustrated embodiment.

FIG. 1 shows an illumination system 100 according to one non-limiting illustrated embodiment. The illumination system 100 includes a luminaire 102, at least one illumination or light source 104, and a control subsystem 106.

The luminaire 102 may take any of a variety of forms. For example, the luminaire 102 may include a housing 108, one or more shades 110 and optionally one or more brackets 112 to allow the luminaire 102 to be hung from a structure. The shade 110 may be transparent or translucent or may be opaque. The luminaire 102 may include one or more sockets or receptacles, for instance a threaded socket or receptacle 114, sized to removably or interchangeably receive a base 115 of the light source 104. The luminaire 102 may include wiring (not called out) to provide power to the light source 104 from an external source of electrical power. Alternatively, the light source 104 may be integral to the luminaire 402, particularly where the light source 104 includes a plurality of solid-state light emitters and hence has a relatively long expected life cycle.

The control subsystem 106 may be integral to the luminaire 102. The control subsystem 106 also includes electrical circuitry or electronics that turns the light source(s) 104 ON and OFF and which adjusts an illumination level downward at a time after the light source is turned ON and adjusts the illumination level upward at a time preceding the light source being turned OFF. Such provides lighting at relatively high levels when illumination is typically most useful, while providing lighting at reduced levels when illumination is not typically useful, thereby reducing energy usage. Such may avoid the drawbacks associated with motion or proximity based control, such as the limited range of motion or proximity sensors and lack of sensitivity of such sensors in warm climates. As described in more detail below, the control subsystem 106 may advantageously correlate a clock with a solar time (e.g., solar midnight, solar noon) as determined by monitoring sensed illumination levels, and may advantageously employ such in controlling the light source(s) 104. Such can automatically accommodate seasonal changes in the length of daylight or night, differences in solar insolation due to geographic location (e.g., latitude of luminaire installation), and/or differences in levels of artificial light between various installations.

In particular, the luminaire 100 and/or control subsystem 106 includes at least one optical sensor 118 (e.g., photosensor, cadmium sulfide cell, photodiode, phototransistor, ambient light sensor integrated circuit) that is responsive to a level of light in the environment (e.g., daylight or ambient light). The optical sensor 118 may be positioned to minimize an affect of the light source 404 on the optical sensor 118. For example, the optical sensor 118 may be positioned on top of the housing 108.

The light source 104 may take a variety of forms. The light source may include one or more distinct light bulbs, lights or light emitters 122a-122n (only two called out in FIG. 1). For example, the light source 104 may take the form of one or more incandescent light bulbs. Also for example, the light source 104 may take the form of one or more florescent light bulbs such as HID light bulbs or lights or one or more arc lamps (collectively gas-discharge lamps). Advantageously, the light source 104 may take the form of one or more solid state light sources, for instance an array of LEDs, OLEDs or PLEDs. While illustrated as a bulb, the light sources do not necessarily have to be enclosed in a bulb structure. For example, the light sources may take the form of one-, two-, or even three-dimensional arrays of individual LEDs or strings of LEDs. Where appropriate, the light source 104 may also include one or more ballasts 124.

Figure 2:
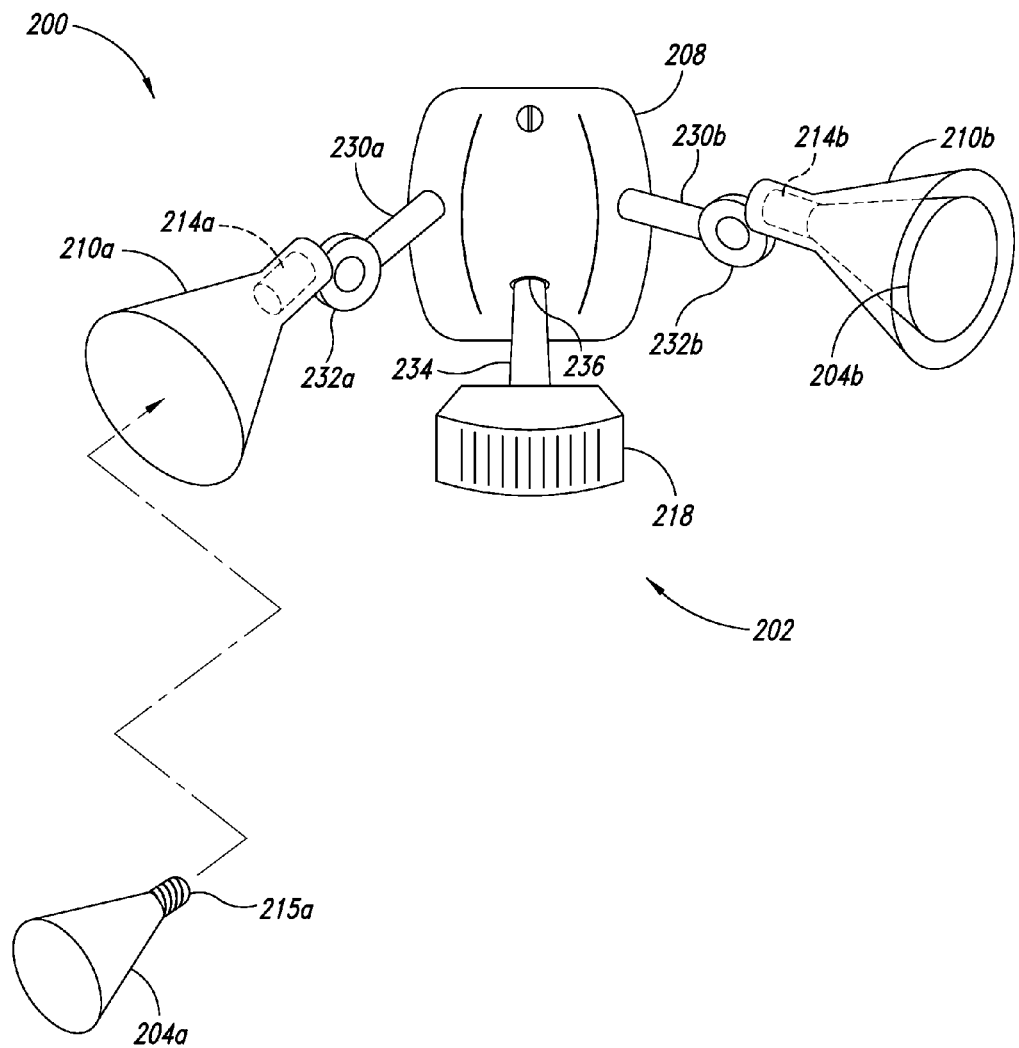
FIG. 2 is a partially exploded isometric diagram showing a luminaire and light sources, according to another non-limiting illustrated embodiment.

FIG. 2 shows an illumination system 200 according to another non-limiting illustrated embodiment. The illumination system 200 includes a luminaire 202, illumination or light sources 204a, 204b, and a control subsystem (not illustrated in FIG. 2).

The luminaire 202 may take any of a variety of forms. For example, the luminaire 202 may include a housing 208, two shades 210a, 210b, and at least one optical sensor 218. The housing 208 allows the luminaire 202 to be hung from a structure. The shades 210a, 210b each include a respective socket or receptacle 214a, 214b sized to receive a base 215a (only one visible in FIG. 2) of the light source 204a, 204b. The shades 210a, 210b may be supported from the housing 208 by respective articulated arms 230a, 230b. The arms 230a, 230b may include one or more joints 232a, 232b to provide multiple degrees of freedom which allows the shades 210a, 210b and respective light sources 204a, 204b to be positioned and oriented in any desired manner. The optical sensor 218 may be supported from the housing 208 by an arm 234, for example via a ball joint 236. Such may allow the optical sensor 218 to be positioned and oriented with respect to the housing 208 and any structure to which the housing is mounted.

Luminaires 202 of this type typically have a control mechanism that implements both dusk-to-dawn and motion or proximity based control. Thus, the control mechanism relies on signals from the optical sensor to implement motion or proximity sensing only during a period after a level of light or illumination in the environment has fallen below a turn ON threshold (e.g., 10 Lux) and before the level of illuminations exceeds a turn OFF threshold (e.g., 30 Lux). The control mechanism will turn the light sources 204a, 204b ON for a period of time in response to the detection of motion between dusk and dawn, turning the light sources 204a, 204b OFF after the period of time.

The control subsystem includes electrical circuitry or electronics that control operation in a similar or identical manner as discussed above in reference to FIG. 1, and as discussed below with reference to FIGS. 6-13.

Figure 3:
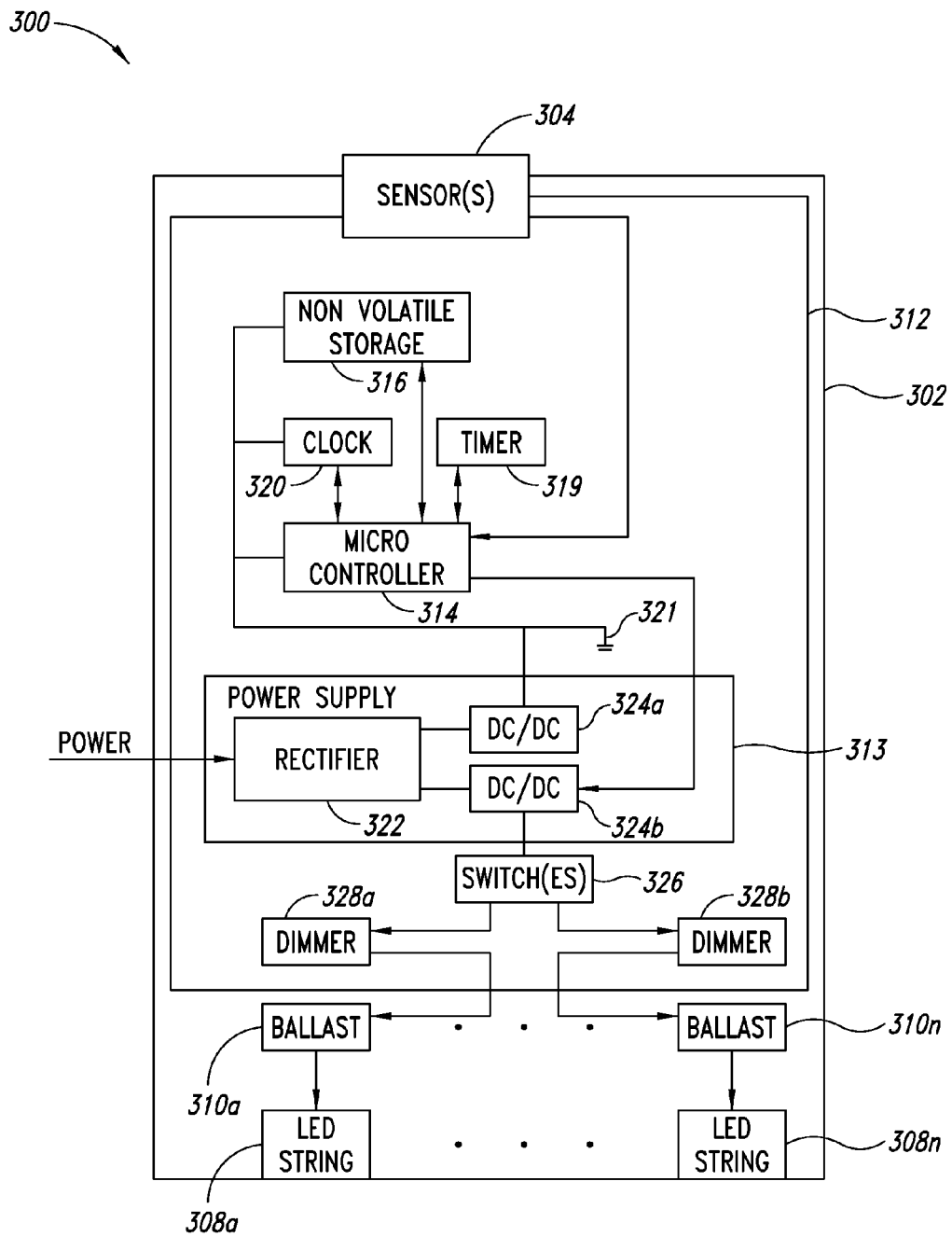
FIG. 3 is a schematic diagram showing the luminaire of FIG. 1 with the control subsystem, and a light source.

FIG. 3 illustrates an illumination system 300, according to one non-limiting illustrated embodiment. The illumination system 300 may be identical or similar to the illumination system 100 (FIG. 1), 200 (FIG. 2).

The illumination system 300 may employ one or more luminaires 302 (only one illustrated in FIG. 3). The luminaires 302 may, for example, be identical or similar to that illustrated in FIG. 1 or 2, or may be of any other style.

The illumination system 300 includes one or more light sources, for example strings of series electrically coupled LEDs 308a-308n (collectively 308). The light sources 308 may be selectively removable or interchangeable from the luminaire. Alternatively, the light sources 308 may be an integral part of the luminaire 302. Various examples of some suitable light sources 308 are described above. The illumination system 300 may optionally include one or more ballasts 310a-310n (collectively 310) for the light sources 308. The ballasts 310 may form part of the control subsystem 312 or the luminaire 302. Alternatively, the ballasts 310 may be an integral or unitary part of the light sources 308.

The illumination system 300 includes a control subsystem 312 which may be integral to the luminaire 302. The control subsystem 312 may be identical or similar to the control subsystem 106 (FIG. 1). The control subsystem 312 may include an optical sensor 304 that senses or is responsive to varying levels (e.g., power or intensity) of light or illumination. The optical sensor 304 may take a variety of forms, some of which are described above. The control subsystem 312 may, for example, include a microcontroller 314 and one or more nonvolatile storage media 316 communicatively coupled to the microcontroller 314.

The microcontroller 314 may take any of a variety of forms, for example a microprocessor, programmable gate array (PGA), application specific integrated circuit (ASIC), etc. The microcontroller 314 may require very limited computing power, for example an 8-bit microcontroller may be sufficient. The microcontroller 314 may be communicatively coupled to receive signals directly from the optical sensor 304.

The nonvolatile storage media 316 may take any of a variety of forms, for example electrically erasable programmable read only memories (EEPROMs), flash memories, etc. The nonvolatile storage media may have a limited storage, allowing only a set number of values to be stored. Such should be sized large enough to allow a statistically good representative sampling (e.g., 3 or more), yet not be so large as to make the system non-responsive to seasonal changes (e.g., less than 20). Thus, the control subsystem may automatically write over existing stored information, for example every number N of daily cycles. Such prevents older samples from being used in determining the average or median, ensuring that samples from only recent daily cycles are employed. Determining averages or medians based on samples from between 5 and 15 daily cycles appears to be suitable.

The control subsystem 312 may include a real time clock 320 (i.e., a clock that tracks time in the real world, e.g., 24-hour or 12-hour clock). A variety of commercially available semiconductor chips may be employed. Alternatively, the microcontroller 314 may implement a real time clock based on timing signals produced by a controller or processor clock or an oscillator.

The control subsystem 312 may further include an analog timer circuit 319 (e.g., capacitor based timer circuit). The analog timer circuit 319 may produce control signals at defined periods following an occurrence of defined times as indicated by the clock of the control subsystem.

As explained in detail below with reference to FIGS. 6-13, the microcontroller 314 correlates solar time and the clock, determine times at which light or illumination levels of the light sources are to be adjusted, and adjust the light or illumination levels accordingly. The microcontroller 314 may determine the times as indicated by the clock at which a time of dusk and/or time of dawn occur based at least in part on the information stored in the nonvolatile storage media 316. For example, the microcontroller 314 may determine the times at which solar midnight (i.e., average or median minimum light or illumination levels) and solar noon (i.e., average or median maximum light or illumination levels) occur, and set a time of dusk and/or time of dawn to be at the times which are midway between the time of dusk and/or time of dawn. Also for example, the microcontroller 314 may determine the times at which a particular rate of change occurs. For instance, the microcontroller 314 may determine the times at which a maximum rate of change occurs or when a minimum rate of change occurs. The times of maximum rate of change may correspond to the midpoints between solar midnight and solar noon, and may be set as the time of dusk and the time of dawn. The microcontroller 314 may determine a direction of change, for example whether the light or illumination level is increasing or decreasing. The microcontroller 314 may use such to match or relate the times of maximum rate of change respectively with solar midnight and solar noon. For instance, a time of maximum rate of change which occurs while the light or illumination level is increasing would indicate dawn, while a time of maximum rate of change which occurs while the light or illumination level is decreasing would indicate dusk. Various specific methods for performing such are also described below. Relying on rate of change and direction may advantageously allow the microcontroller 314 determine the diurnal cycle in a relatively short period of time as compared to other approaches.

The control subsystem 312 may include power supply circuitry 313 that rectifies, steps down a voltage and otherwise conditions supplied electrical power to a form suitable to power the microcontroller 314, nonvolatile storage media 316 and/or other components of the integral control subsystem 312, as well as to power the light sources 308. The power supply circuitry 313 may supply power to the various components of the control subsystem 312. The power supply circuitry 313 may supply power to recharge the optional standalone power source 321 (e.g., battery cells, capacitors, super- or ultracapacitors, fuel cell), which supplies power to the components of the control subsystem 312 when needed, for example in the event of loss of power from the grid or other external power source. For example, the discrete internal power source 321 may supply power to the clock 320 in instances where power from an external source is interrupted.

In particular, power supply circuitry 313 may include one or more rectifiers 322, DC/DC converters (e.g., buck converters) 324a, 324b (collectively 324), isolation transformers, filters, smoothing capacitors, etc. to rectify, step a voltage and otherwise transform or condition electrical power from an external source into a form suitable to power the components of the control subsystem 312 and/or light sources 308. A first DC/DC buck converter 324a may step a voltage down to a first level suitable for the control electronics of the control subsystem 312. A second DC/DC converter 324b may step a voltage down or up, to a level suitable for driving the light sources 308.

The control subsystem 312 may employ a number of switches 326 or other mechanisms to turn the light source 308 ON and OFF and/or to adjust the level of light output by the light source 308. For example, the control subsystem 312 may employ various switches, for example contact switches, relays, transistors, triacs, control line into lighting ballast. Additionally, or alternatively, the control subsystem 312 may employ conventional dimmer circuits 328a, 328b (collectively 328). Alternatively or additionally, a network link to a programmable lamp controller may be employed. Alternatively or additionally, an analog voltage applied to a dimmable lamp controller may be employed. The control subsystem 312 may adjust the level of light by adjusting a level of light emitted by each discrete light emitter and/or by adjusting the number of discrete light emitters emitting light. For example, the control subsystem 312 may use one or more switches 326 to turn ON or turn OFF individual or groups (e.g., series strings) of light emitters that make up one or more light sources 308, or to turn ON or turn OFF dimmers 328 or lamp controllers which control the light sources 308. As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced. As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

The microcontroller 314 receives signals from the optical sensor 304 which are indicative of levels of light sensed in the environment around or proximate the optical sensor 304. The microcontroller 314 of the control subsystem 312 may store information to the nonvolatile storage media 316 related to or indicative of the sensed levels of illumination in the environment. An analog-to-digital converter (not shown) may digitize the signals before processing by the microcontroller 314. Alternatively, the microcontroller 314 may digitize the signal. The microcontroller 314 can store the information so as to correlate or create logical relationships between the sensed levels and a time (e.g., real time) as indicated by the clock 320. The microcontroller 314 can use the information to determine times as indicated by the clock 320 (i.e., in the temporal reference frame of the clock 320) with the solar cycle for any daily cycle, and to control the light sources accordingly.

The light or illumination levels represent or are indicative of a solar time or solar cycle. For example, the highest light or illumination levels sensed will typically represent solar midday or noon, the time during or at which solar insolation is highest. Also for example, the lowest light or illumination levels will typically represent solar midnight, the time during or at which solar insolation is lowest. The microcontroller 314 may execute a peak detection algorithm or set of instructions to determine highest and lowest levels of light or illumination over some period of time (e.g., multiple daily cycles). The microcontroller 314 may use such to correlate the clock 320 with the solar cycle. For example, the microcontroller 314 may determine a time of dusk to be a time at which a level of light or illumination is some defined percentage greater than a minimum level of light or illumination (i.e., solar midnight) represented in the set of information or data stored in the nonvolatile storage media 316. Similarly, the microcontroller 314 may determine a time of dawn to be a time at which a level of light or illumination is some defined percentage less than a maximum level of light or illumination (i.e., solar noon) represented in the set of information or data stored in the nonvolatile storage media 316. Once the time of dawn and time of dusk are determined and set, the microcontroller may simply track time as indicated by the clock 320, rather than performing comparisons to ON and/or OFF thresholds.

While it may be possible to correlate the clock 320 with the solar cycle based on samples collected from a single daily cycle, in most instances samples collected over two or more daily cycles may produce more robust results. Hence, as explained in more detail below with reference to FIGS. 9 and 11, from time to time (e.g., periodically, non-periodically, continuously,) the microcontroller 314 may determine an average or median time as indicated by the clock 320 (i.e., in the temporal reference frame of the clock) that certain events in the solar cycle occur. The events may, for example include solar noon and/or midnight, occurrence of a defined rate of change or change in direction (i.e., point of inflection such as change between increasing and decreasing levels of illumination). The microcontroller 314 may set adjustment times based on the determined averages or medians. The microcontroller 314 may implement a low-pass digital filter to remove short term artificial light events (e.g., passing automobile, clouds) from the stored information.

For example, a microcontroller 314 may determine an average and/or median based on values stored in a nonvolatile storage media which represent the illumination levels for the same times for each of a number of previous daily cycles. As noted above, the number of daily cycles should be sufficiently large to allow a statistically meaningful sampling but not so large as to make the determination non-responsive to changes in the amounts of daylight and nighttime which occur throughout a year. Such limits on the number of samples is not necessarily required for the control subsystem to function, but will likely improve performance. Thus, a different number of samples may be employed in practice. For example, when initially starting or when restarting, the control subsystem may employ only a single daily cycle, increasing the number of daily cycles as information is collected and stored. In particular, the control subsystem may perform a teaching or training cycle in which samples are collected but are unused until some desired minimum level is collected.

The optional analog timer circuit 319 of the control subsystem 312 may produce at least a first control signal at a first defined period following an occurrence of a first time as indicated by the clock of the control subsystem. The analog timer circuit 319 may produce control signals to increase and/or decrease levels of light or illumination produced by the light source(s) at respective defined periods following occurrence of an ON time in the temporal reference frame of the clock. The analog timer circuit 319 may additionally, or alternatively, produce control signals to turn OFF the light source(s) at a respective defined period following occurrence of an ON time in the temporal reference frame of the clock. capacitor based timer circuit with defined delay times to implement one or more of the specific adjustment times.

The control subsystem 312 accommodates to changes in the relative amounts of daylight and darkness throughout the year. The control subsystem 312 also accommodates variations in the relative amounts of daylight and darkness at different geographic locations. Thus, for example, a single type of illumination may be manufactured and sold and/or installed in locations at widely different latitudes (e.g., Miami, Fla. and Nome, Ak.). Notably, the variation in the length of daylight/nighttime is more extreme the farther a location is from the Equator. Thus, the control subsystem can automatically accommodate to the significant differences between locales.

FIG. 4A shows a graph 400*a* of a level of light produced by a light source over time during a first part of a year, according to one non-limiting illustrated embodiment.

In particular, the level of light output by the light source is shown along the Y-axis, while time is shown along the X-axis. In a first daily cycle 402*a*, the light source is turned on at 404*a* to produce light at a first level (e.g., relatively high) 406*a* for a first duration 408*a*. The level of light produced by the light source is then adjusted at 410*a* to produce a lower level 412*a* of light for a second duration 414*a*. The level of light produced is then adjusted at 416*a* to produce a higher level 406*a* of light for a third duration 418*a*. While illustrated as equal to the level 406*a* of the first duration 408*a*, the level 406*a* of the third duration 418*a* may be greater or less than the level 406*a* during the first duration 408*a*. The light source is then turned off at 420*a* for a fourth duration 422*a* during the daily cycle 402*a*. As illustrated, this repeats for additional daily cycles, although the length of the various durations may gradually change, for example as the amount of daylight during the daily cycle changes.

FIG. 4B shows a graph 400*b* of a level of light produced by a light source over time during a first part of a year, according to one non-limiting illustrated embodiment.

Times or durations corresponding to those of FIG. 4A are called out using the same reference numerals but with the lower case letter "b" instead of the lower case letter "a" used in FIG. 4A. The pattern is similar to that illustrated in FIG. 4A, however the second duration 414*b* at the lower level 412*b* is longer than that illustrated in FIG. 4A. Such is in response to the amount of daylight in the daily cycle 402*b* being shorter that that illustrated in FIG. 4A. Thus, FIG. 4A may represent summer in the Northern Hemisphere, while FIG. 4B may represent winter in the same location.

FIG. 4C shows a graph 400*c* of a level of light produced by a light source over time during a first part of a year, according to one non-limiting illustrated embodiment.

Times or durations corresponding to those of FIGS. 4A and 4B are called out using the same reference numerals but with the lower case letter "c" instead of the lower case letter "a" or "b" used in FIGS. 4A and 4B, respectively. The pattern is similar to that illustrated in FIG. 4B, however the first and third durations 408*c*, 418*c* at the high level 406*c* are longer than that illustrated in FIG. 4B. Such durations 408*c*, 418*c* may be factory set or may be user configurable, set based on user input received via a user interface (e.g., buttons, switches, dials, potentiometers, shorting jumpers, wired or wireless communications ports, or via power line carrier control) of the luminaire. Such user input may, for instance, indicate a fixed time for the first and third durations or may indicate percentages of the total period that the light source is turned ON that should be apportioned to the first and third durations.

FIG. 4D shows a graph 400*d* of a level of light produced by a light source over time during a first part of a year, according to one non-limiting illustrated embodiment.

Times or durations corresponding to those of FIGS. 4A-4C are called out using the same reference numerals but with the lower case letter "d" instead of the lower case letter "a" "b" or "c" used in FIGS. 4A-4C, respectively. The pattern is similar to that illustrated in FIG. 4C, however the first and third durations 408d, 418d are of unequal lengths with respect to one another. As previously noted, such durations 408d, 418d may be user configurable, set based on user input received via a user interface (e.g., buttons, switches, dials, communications port) of the luminaire.

Figure 5:
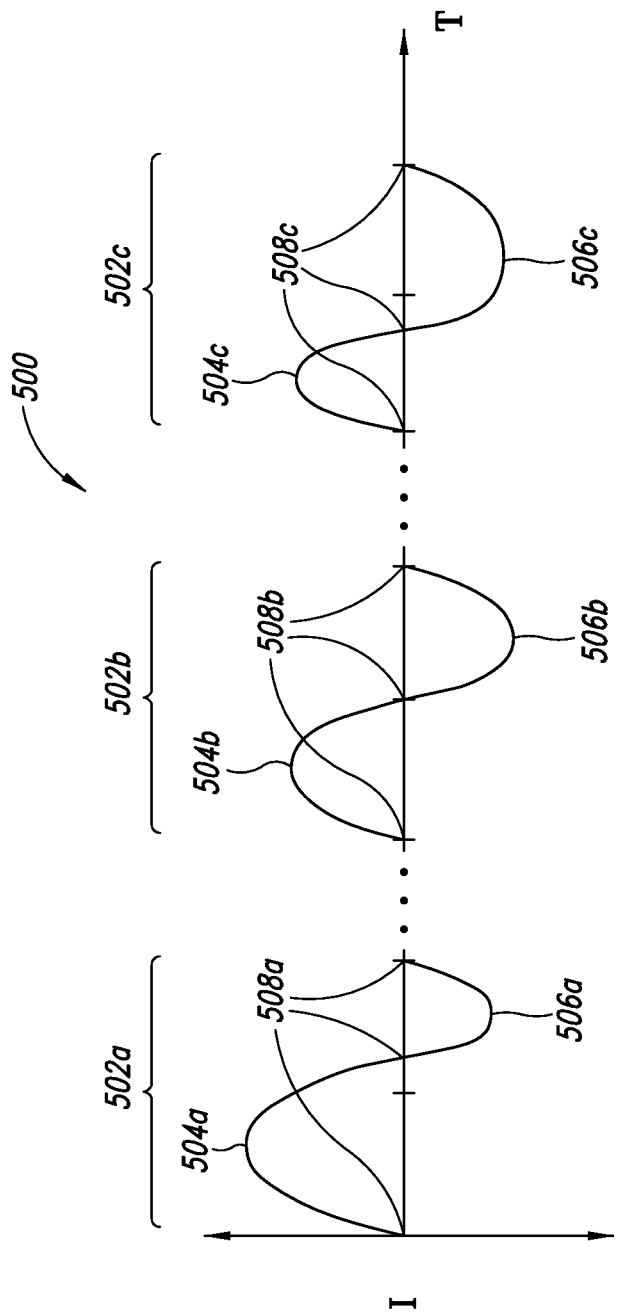
FIG. 5 is a graph of a light or illumination level versus time for several daily cycles over the course of a period of time, such as a year.

FIG. 5 shows a graph of a level of light or illumination 500 produced by the sun at a location over time during a number of daily cycles 502a-502c (collectively 502) over a period of time such as a year.

The level of solar insolation over a daily cycle 502 varies approximately as a sinusoidal curve. While the length of any given daily cycle 502 is approximately 24 hours, the amount of daylight and nighttime vary inversely with one another. Depending on the latitude of the location, this variation may be relatively small or nonexistent for instance proximate the Equator, or may be relatively large for instance at or proximate the Poles.

In the illustrated example, a first daily cycle 502a has a relatively long amount of daylight relative to nighttime, and a relatively high maximum level of solar insolation 504a, corresponding to solar noon. Solar midnight occurs at a minimum level of solar insolation 506a. Thus, the first daily cycle 502a may, for instance, represent a daily cycle occurring during the Summer in the Northern or Southern Hemispheres. A maximum rate of change 508a in the level of light or illumination occurs at the zero crossing, while a minimum rate of change (not called out) occurs at the maximum and minimum levels. The direction of level (e.g., increasing or decreasing) can also easily be discerned in FIG. 5.

In the illustrated example, a second daily cycle 502b has a relatively long amount of daylight relative to nighttime, and a relatively high maximum level of solar insolation 504b, corresponding to solar noon. Solar midnight occurs at a minimum level of solar insolation 506b. Thus, the first daily cycle 502b may, for instance, represent a daily cycle occurring during the Spring or Fall in the Northern or Southern Hemispheres. A maximum rate of change 508b in the level of light or illumination occurs at the zero crossing, while a minimum rate of change (not called out) occurs at the maximum and minimum levels.

In the illustrated example, a second daily cycle 502c has a relatively long amount of daylight relative to nighttime, and a relatively high maximum level of solar insolation 504c, corresponding to solar noon. Solar midnight occurs at a minimum level of solar insolation 506c. Thus, the first daily cycle 502c may, for instance, represent a daily cycle occurring during the Winter in the Northern or the Summer in the Southern Hemispheres. A maximum rate of change 508c in the level of light or illumination occurs at the zero crossing, while a minimum rate of change (not called out) occurs at the maximum and minimum levels.

Figure 6:
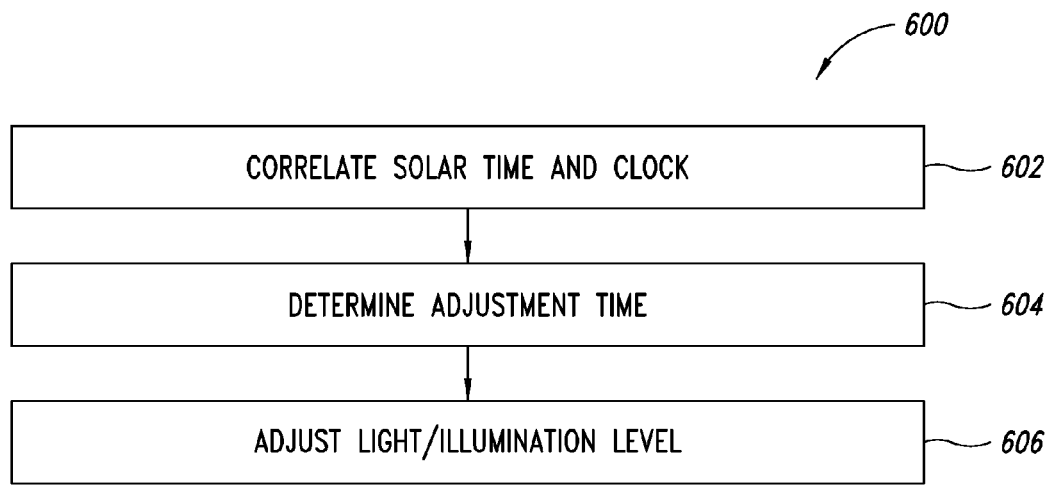
FIG. 6 is a flow diagram showing a high level method of operating an illumination system to provide illumination in an energy efficient manner, according to one non-limiting illustrated embodiment.

FIG. 6 shows a high level method 600 of operating an illumination system to provide illumination in an energy efficient manner, according to one non-limiting illustrated embodiment.

At 602, the control subsystem correlates solar time and a "real time" clock. As explained above, the control subsystem may sample sensed levels of light or illumination at various times during each daily cycle. The microcontroller may store information indicative of the sensed levels to nonvolatile storage media in such a way as to correlate or create logical relationships between the sensed levels and respective times (e.g., real time) as indicated by the clock. The microcontroller can use the information to determine times as indicated by the clock (i.e., in the temporal reference frame of the clock) with the solar cycle for any daily cycle, and to control the light sources accordingly.

For example, dedicated portions of the nonvolatile storage media may be logically associated with respective times as indicated by the clock. Alternatively, the microcontroller may store information indicative of the light or illuminations levels to locations in the nonvolatile storage media in a defined pattern (e.g., sequentially). If the sampling rate is known, the stored information can be related to times as indicated by or in the temporal reference frame of the clock. Alternatively, the information stored may also indicate a respective time at which the sampled light or illumination level was taken or captured, in addition to the level. Other approaches to logically relating the sampled light or illumination levels to the clock are possible. Specific methods of correlating are described below with reference to FIG. 7.

At 604, the control subsystem determines one or more adjustment times at which to adjust a level of light or illumination produced or emitted by one or more light sources. As previously noted, adjustment includes adjusting a level of light or illumination produced from light sources in an ON state, as well as adjusting a level of light or illumination by changing between ON and OFF states. In particular, the microcontroller may determine the adjustment times (e.g., times as indicated by the clock when light sources will be turned ON, decreased output, increased output, turned OFF). Alternatively, or additionally, the control subsystem may include an analog electronic delay circuit to implement such. For example, the control subsystem may include a simple capacitor based timer circuit with defined delay times to implement one or more of the specific adjustment times. The timer circuit may produce control signals to increase and/or decrease levels of light or illumination produced by the light source(s) at respective defined periods following occurrence of an ON time in the temporal reference frame of the clock. The timer circuit may additionally or alternatively produce control signals to turn OFF the light source(s) at a respective defined period following occurrence of an ON time in the temporal reference frame of the clock. Specific methods of determining adjustment times are described below with reference to FIGS. 8-12.

At 606, the control subsystem adjusts the level of light or illumination produced or emitted by one or more light sources, in response to the occurrence of the determined adjustment times as indicated by the clock. Specific methods of adjusting the level of light or illumination are discussed below with reference to FIG. 13.

Figure 7:
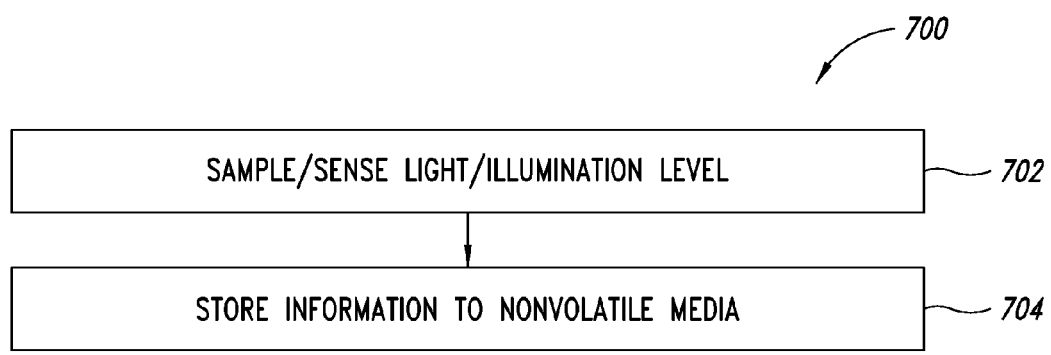
FIG. 7 is a flow diagram showing a low level method of operating a control subsystem of an illumination system to correlate solar time and a clock, according to one non-limiting illustrated embodiment.

FIG. 7 shows a method 700 of operating a control subsystem of an illumination system to correlate solar time and a clock, according to one non-limiting illustrated embodiment.

At 702, the microcontroller samples levels of light or illumination in the environment sensed by the at least one sensor. Such may occur from time to time during each daily cycle. For example, such may occur periodically during each daily cycle or non-periodically. The sensor may continually sense levels of light or illumination or may sense levels of light or illumination in response to a trigger signal from the microcontroller. The level of light or illumination may be indicated by one or more signals in any variety of fashions, for example as a magnitude of current or voltage of an analog signal, or as a digital value of a digital signal.

At 704, the microcontroller stores information to a portion of at least one nonvolatile storage medium. The information indicates the sensed level of light or illumination. As previously noted, the information may be stored in such a way as to provide an indication of the time at which the sample was taken. For example, portions of the nonvolatile storage media may be logically assigned to different times as indicated by the clock. For instance, the nonvolatile storage media may be logically divided into N portions, each representing a respective one of a number of successive daily cycles. Each of the N portions may be further logically divided into a number of M portions, each representing a respective time during the daily cycle, for instance hours, half hours, quarter hours, minutes, etc. Also for example, information for samples may simply be stored in a defined pattern, for instance sequentially. The microcontroller can correlate the stored information to respective times as indicated by the clock based on a defined sampling frequency. Alternatively, the information that is stored may also indicate the time during the daily cycle, as indicated by the clock, when the sample was taken. Other ways of correlating levels of illumination, which are indicative of a "solar time" with "real time" as indicated by a clock could likewise be employed.

Optionally, the microcontroller may perform filtering, eliminating or not storing information for sensed levels of light or illumination that are suspect. Such may be performed based on a level being substantially larger or smaller compared to one or more levels at the same or similar time during one or more immediately preceding daily cycles, or an average or median of levels. Such may additionally, or alternatively, be performed based on a magnitude and/or direction of change in levels with respect to other levels at immediately preceding times during the same daily cycle. Such may filter out events produced by artificial light.

Figure 8:
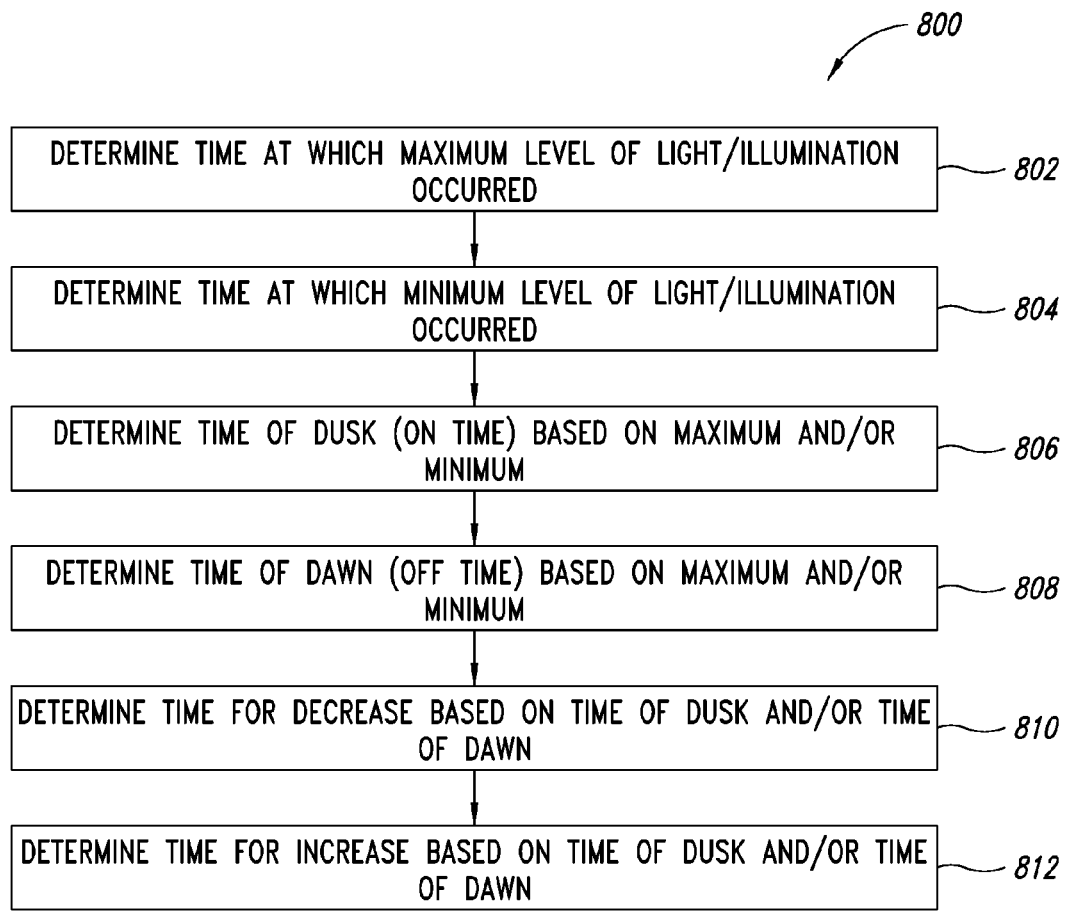
FIG. 8 is a flow diagram showing a low level method of operating a control subsystem of an illumination system to determine times to adjust a level of light or illumination produced by at least one light source based on maximum and minimum levels of light or illumination, according to one non-limiting illustrated embodiment.

FIG. 8 shows a method 800 of operating a control subsystem of an illumination system to determine times to adjust a level of light or illumination produced by at least one light source based on maximum and minimum levels of light or illumination, according to one non-limiting illustrated embodiment.

At 802, the microcontroller determines any times at which a maximum level of light or illumination has occurred during a number N of previous daily cycles. Such times correspond to solar noon, that is the time of maximum solar insolation. The times may be indicated in the temporal reference frame of the clock.

At 804, the microcontroller determines any times at which a minimum level of light or illumination has occurred during a number N of previous daily cycles. Such times correspond to solar midnight, that is the time of minimum solar insolation. The times may be indicated in the temporal reference frame of the clock.

At 806, the microcontroller determines a time of dusk based at least in part on at least one of the determined times at which a maximum and/or a minimum level of light or illumination occurred. The time of dusk will typically be at least proximate a mid-point between the solar noon (i.e., time of sensed maximum level of light or illumination) and solar midnight (i.e., time of sensed minimum level of light or illumination). This time may be used as the time at which to turn ON the light sources to a first, relatively high, level, or used to determine the time at which to turn ON the light sources at the first level. Alternatively, the microcontroller may use some offset from the time of maximum level of light or illumination, which offset may, for instance, be based on the length of daylight or length of nighttime over a number of preceding daily cycles (e.g., average or median periods of daylight or nighttime).

At 808, the microcontroller determines a time of dawn based at least in part on at least one of the determined times at which a maximum and/or a minimum level of light or illumination occurred. The time of dawn will typically be at least proximate a mid-point between solar midnight (i.e., time of sensed minimum level of light or illumination) and solar noon (i.e., time of sensed maximum level of light or illumination). The determined time of dawn may be used as the time at which the microcontroller will turn OFF (e.g., zero level) the light source(s). The microcontroller may also use the time of dawn to determine the time at which the microcontroller will turn OFF the light source(s). Alternatively, the microcontroller may use some offset from the time of minimum level of light or illumination, which offset may, for instance, be based on the length of daylight or length of nighttime over a number of preceding daily cycles (e.g., average or median periods of daylight or nighttime).

At 810, the microcontroller determines a "decrease" time, that is a time at which to decrease or reduce a level of light or illumination produced by at least one light source to a second non-zero level which is lower than the first level. The microcontroller may determine the decrease time based at least in part on the determined times of dusk and/or dawn. Alternatively, the microcontroller may determine the decrease time based at least in part on the determined times at which a maximum and/or a minimum level of light or illumination occurred over one or more previous daily cycles. The decrease time will typically occur some defined duration or period of time following the turning ON of the illumination sources to the first level. The length of this first duration or period may, for example, be factory set or may be user configurable via a user input interface. Where factory set or user configurable, the length may be a fixed period. Alternatively, the microcontroller may determine the length of this first duration or period of time based on one or more parameters, for example sensed information. For instance, the length of the first duration or period may be a function of the total amount of daylight or night in a daily cycle. Thus, the length of the first duration or period may vary throughout the year to accommodate seasonal changes in the length of daylight. The light sources will produce light at one or more reduced levels for a second duration or period of time.

At 812, the microcontroller determines an "increase" time, that is a time at which to increase or raise a level of light or illumination produced by at least one light source to a third non-zero level which is high than the second level. In some instances, the third level will be at least approximately equal to the first level. The microcontroller may determine the increase time based at least in part on the determined times of dusk and/or dawn. Alternatively, the microcontroller may determine the increase time based at least in part on the determined times at which a maximum and/or a minimum level of light or illumination occurred over one or more previous daily cycles. The increase time will typically occur some defined third duration or period of time preceding the turning OFF of the illumination sources (e.g., to a zero level). The length of this third duration or period, following the second duration or period, may, for example, be factory set or may be user configurable via a user input interface. Where factory set or user configurable, the length may be a fixed period. Alternatively, the microcontroller may determine the length of this third duration or period of time based on one or more parameters, for example sensed information. For instance, the length of the third duration or period may be a function of the total amount of daylight or night in a daily cycle. Thus, the length of the third duration or period may vary throughout the year to accommodate seasonal changes in the length of daylight.

Figure 9:
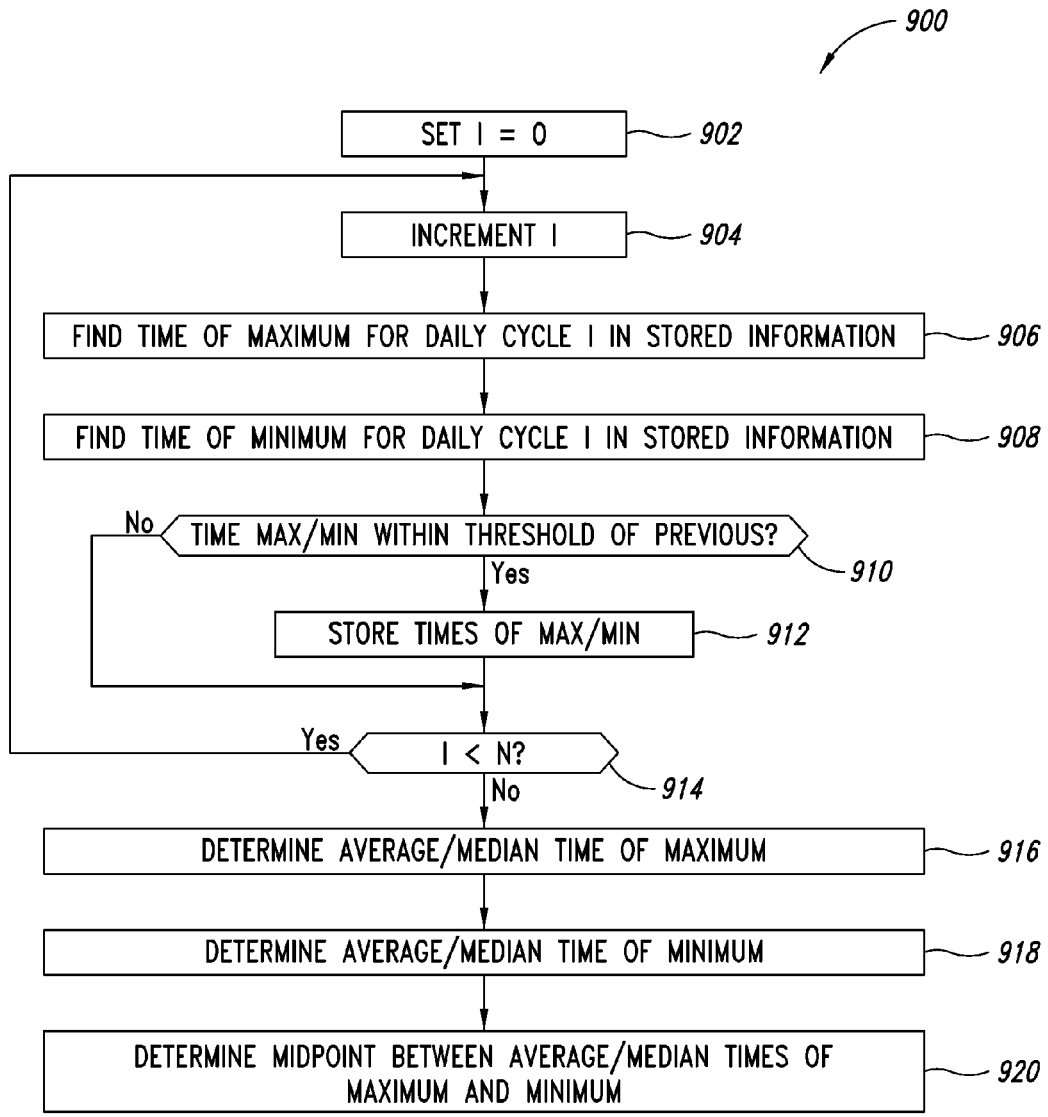
FIG. 9 is a flow diagram showing a low level method of operating a control subsystem of an illumination system to determine times to adjust a level of light or illumination produced by at least one light source using stored information indicative of maximum and minimum light or illumination levels over a number of previous daily cycles, according to one non-limiting illustrated embodiment.

FIG. 9 shows a method 900 of operating a control subsystem of an illumination system to determine times to adjust a level of light or illumination produced by at least one light source using stored information indicative of maximum and minimum light or illumination levels over a number of previous daily cycles, according to one non-limiting illustrated embodiment.

At 902, the microcontroller initializes a daily cycle counter I, for example setting the counter to zero. The daily cycle counter allows the microcontroller to analyze information for a defined number of previous daily cycles stored in the nonvolatile storage media. At 904, the microcontroller increments the counter.

At 906, the microcontroller determines or finds a time at which a maximum level of light or illumination occurred for the daily cycle being analyzed.

At 908, the microcontroller determines or finds a time at which a minimum level of light or illumination occurred for the daily cycle being analyzed. While the method illustrated finding both the maximum and minimum, some embodiments may find only the maximum or only the minimum. Still other embodiments may find other distinctive portions of the solar cycle, for example points of inflection, and/or points at which maximum or minimum rates of change occur in the solar cycle.

At 910, the microcontroller determines whether the determined time(s) that the maximum and/or minimum levels occurred for the daily cycle being analyzed is within a defined threshold of a time at which a similar event occurred during at least one previous daily cycle. Such may advantageously filter out aberrant events, such as those produced by artificial light. Thus, for example, if the time that a maximum level of light or illumination occurs changes dramatically from times for the same type of event in previous daily cycles, such time may be ignored or omitted. For instance, a change in the time of dusk and/or time of dawn between successive daily cycles may be limited to a relatively small amount, the amount being equal to or slightly larger than the shift in the length of daylight or night which results from a change in angle of the surface of the Earth with respect to the Sun over the course of a year. The amount varies by latitude and season. The amount may be set to a maximum which may be encountered at the greatest latitude in the season in which the illumination system may be sold, distributed or installed. Alternatively, the microcontroller may set the limit amount based on the maximum and minimum lengths of days detected over some extended period of time.

At 912, if the time is or times are not determined to be aberrant, the microcontroller stores the time(s). The microcontroller may store the times to nonvolatile storage or to a volatile storage media such as one or more registers of the microcontroller. As discussed below, the microcontroller may temporarily store such times for use in determining an average, median or other value.

At 914, the microcontroller determines whether the daily cycle counter is less than a defined value. The defined value sets the number of daily cycles which are used to analyze information. The defined value may be any number of daily cycles, but will typically be between 2 and 10 daily cycles, inclusive. Such prevents aberrant conditions from affecting the outcome while not including so many samples as to render the method unresponsive to changes in length of day throughout the year. Control returns to 904 if there are additional daily cycles to include in the analysis, or passes to 916 if there are not.

At 916, the microcontroller determines an average and/or median time at which a maximum level of light or illumination occurred over the number N of daily cycles. The microcontroller may use the times previously stored at 912. Such provides a good indication of when solar noon has been recently occurring with respect to the clock.

At 918, the microcontroller determines an average and/or median time at which a minimum level of light or illumination occurred over the number N of daily cycles. The microcontroller may use the times previously stored at 912. Such provides a good indication of when solar midnight has been recently occurring with respect to the temporal time frame of the clock.

At 920, the microcontroller determines midpoints between the average or median times at which the maximum and minimum levels of light or illumination occurred. Such provides a good indication of time of dusk and time of dawn, with respect to the temporal time frame of the clock.

Figure 10:
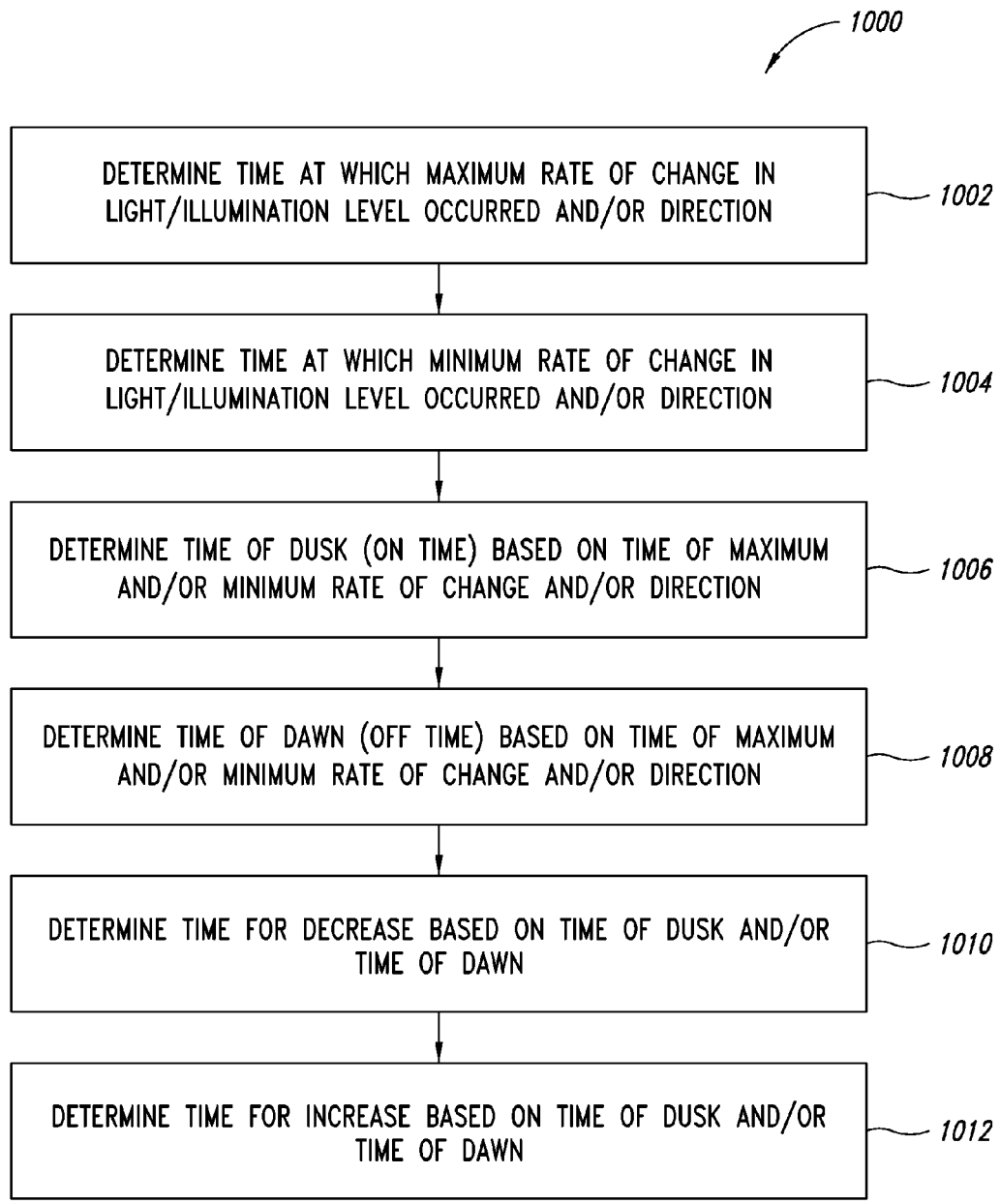
FIG. 10 is a flow diagram showing a low level method of operating a control subsystem of an illumination system to determine times to adjust a level of light or illumination produced by at least one light source based on maximum and minimum rates of change of levels of light or illumination and direction of changes, according to one non-limiting illustrated embodiment.

FIG. 10 shows a method 1000 of operating a control subsystem of an illumination system to determine times to adjust a level of light or illumination produced by at least one light source based on maximum and minimum rates of change of levels of light or illumination and direction of changes, according to one non-limiting illustrated embodiment.

At 1002, the microcontroller determines or finds a time at which a maximum rate of change in the level of light or illumination occurred for the daily cycle being analyzed.

Optionally at 1004, the microcontroller may determine or find a time at which a minimum rate of change in the level of light or illumination occurred for the daily cycle being analyzed.

At 1006, the microcontroller determines the time of dusk based at least in part on at least one of the time at which the maximum and/or minimum rate of change occurred. At 1008, the microcontroller determines the time of dawn based at least in part on at least one of the time at which the maximum and/or minimum rate of change occurred. Notably, the maximum rate of change typically occurs midway between the occurrence of the maximum and minimum levels of light or illumination. Consequently, the times at which the maximum rate of change occurs may be the time of dusk and time of dawn. The occurrence of the minimum rate of change typically occurs when the maximum and minimum levels of light or illumination occur. The time of dusk and time of dawn may be the midpoint between these two events.

At 1010, the microcontroller determines a "decrease" time at which to decrease a level of light or illumination following turning ON at a first level. The microcontroller may determine the decrease time based at least in part on at least one of the determined time of dusk or determined time of dawn. For example, the microcontroller may set the decrease time a defined period after a turn ON time. Such defined period may be defined by the manufacturer or user, or may be based on one or more parameters such as sensed length of day or night over one or more preceding daily cycles.

At 1012, the microcontroller determines an "increase" time at which to increase a level of light or illumination preceding turning OFF of the light sources. The microcontroller may determine the increase time based at least in part on at least one of the determined time of dusk or determined time of dawn. For example, the microcontroller may set the increase time a defined period after a turn ON time or a defined period before a turn OFF time. Such defined period may be defined by the manufacturer or user, or may be based on one or more parameters such as sensed length of day or night over one or more preceding daily cycles.

Figure 11:
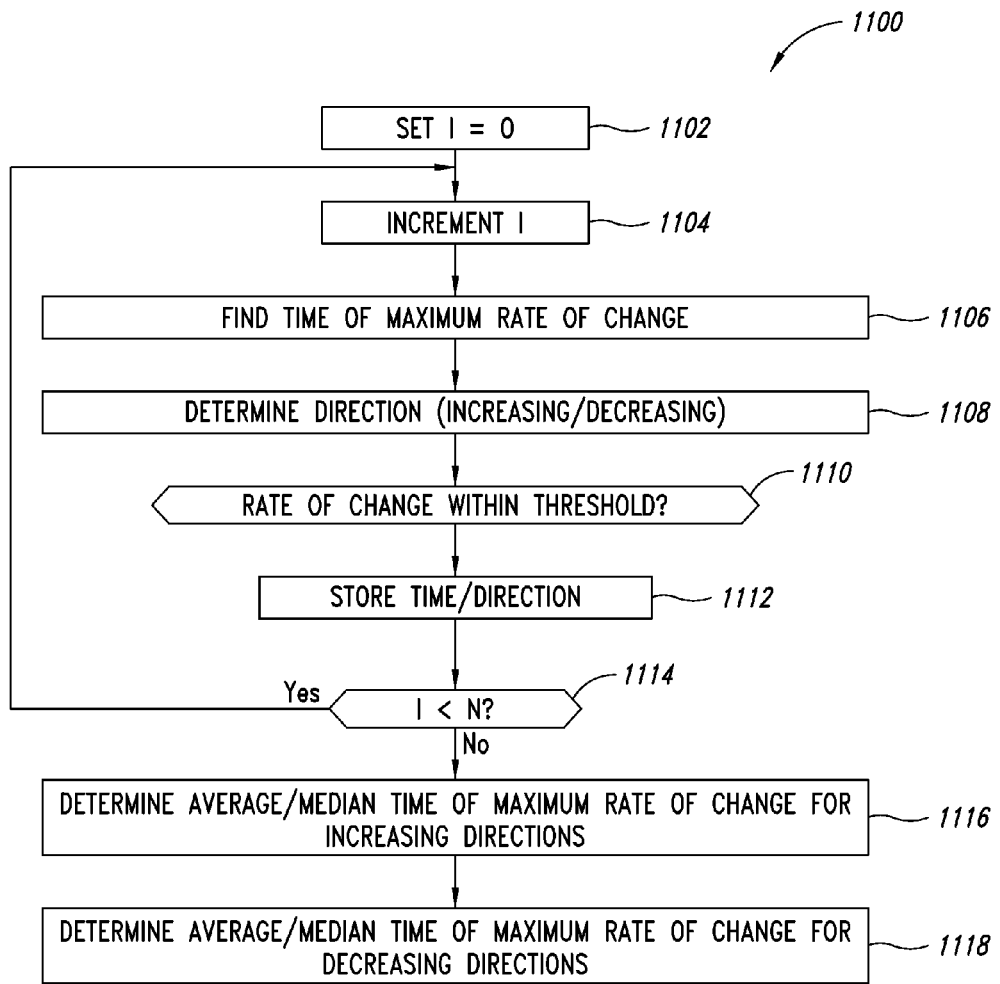
FIG. 11 is a flow diagram showing a low level method of operating a control subsystem of an illumination system to determine times to adjust a level of light or illumination produced by at least one light source using stored information indicative of maximum rates of change and direction of changes over a number of previous daily cycles, according to one non-limiting illustrated embodiment.

FIG. 11 shows a method 1100 of operating a control subsystem of an illumination system to determine times to adjust a level of light or illumination produced by at least one light source using stored information indicative of maximum rates of change and direction of changes over a number of previous daily cycles, according to one non-limiting illustrated embodiment.

At 1102, the microcontroller initializes a daily cycle counter I, for example setting the counter to zero. The daily cycle counter allows the microcontroller to analyze information for a defined number of previous daily cycles stored in the nonvolatile storage media. At 1104, the microcontroller increments the counter.

At 1106, the microcontroller determines or finds a time at which a maximum rate of change in the level of light or illumination occurred for the daily cycle being analyzed.

At 1108, the microcontroller determines a direction (i.e., increasing, decreasing) of the change in level of illumination. The microcontroller can use such to determine whether a maximum rate of change is associated with a time of dusk or with a time of dawn.

At 1110, the microcontroller determines whether the maximum rate of change is within a rate of change threshold. The microcontroller can employ such to remove aberrant events, for example where the rate of change is too fast, or too slow, to correspond to solar insolation. For instance, a threshold may be programmed or provided by the manufacturer or user, or the microcontroller may determine such based on a maximum rate of change which could occur in the most Northern or most Southern markets in which the illumination system may be distributed or installed. Alternatively, the microcontroller may configure the rate of change threshold based on samples of rate of change from a number of previous daily cycles, for instance recent daily cycles.

At 1112, if the time is or times are not determined to be aberrant, the microcontroller stores the time(s). The microcontroller may store the times to nonvolatile storage or to a volatile storage media such as one or more registers of the microcontroller. As discussed below, the microcontroller may temporarily store such times for use in determining an average, median or other value.

At 1114, the microcontroller determines whether the daily cycle counter is less than a defined value. The defined value sets the number of daily cycles which are used to analyze information. The defined value may be any number of daily cycles, but will typically be between 2 and 10 daily cycles, inclusive. Such prevents aberrant conditions from affecting the outcome while not including so many samples as to render the method unresponsive to changes in length of day throughout the year. Control returns to 1104 if there are additional daily cycles to include in the analysis, or passes to 1116 if there are not.

At 1116, the microcontroller determines an average and/or median time at which a maximum rate of change in the level of light or illumination in an increasing direction has occurred over the number N of daily cycles. The microcontroller may use the times previously stored at 1112. Such provides a good indication when the time of dawn has been recently occurring with respect to the temporal time frame of the clock.

At 1118, the microcontroller determines an average and/or median time at which a maximum rate of change in the level of light or illumination in a decreasing direction has occurred over the number N of daily cycles. The microcontroller may use the times previously stored at 1112. Such provides a good indication when the time of dusk has been recently occurring with respect to the temporal time frame of the clock.

Figure 12:
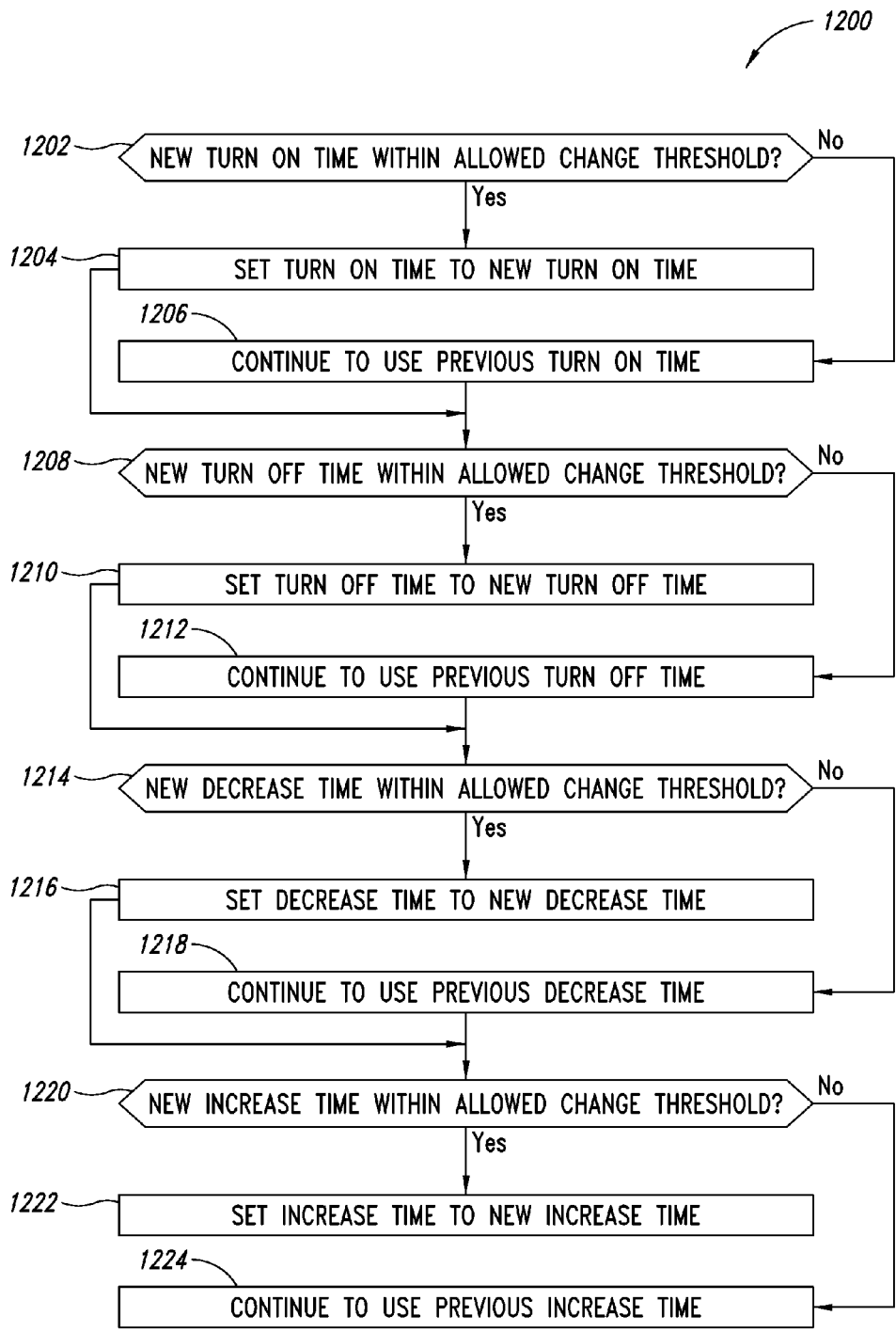
FIG. 12 is a flow diagram showing a low level method of operating a control subsystem to set various times at which to increase and decrease levels of light output, according to one non-limiting illustrated embodiment.

FIG. 12 shows a method 1200 of operating a control subsystem to set various times at which to increase and decrease levels of light output, according to one non-limiting illustrated embodiment.

At 1202, the microcontroller determines whether a new turn ON time is within an allowed change threshold. The allowed change threshold filters out large changes in times which may result from aberrant conditions. Thus, changes in time that are too large relative to previous turn ON time(s) may be filtered out. The allowed change threshold may be programmed or provided by the manufacturer or user, or the microcontroller may determine such based on various parameters, for instance sensed parameters such as levels of light or illumination or time or periods between various levels (e.g., length of daylight, length of night). The allowed change threshold may be specific to the turn ON time or may be employed for other determined times.

If the new turn ON time is within the allowed change threshold, at 1204 the microcontroller sets the turn ON time to the new turn ON time. If not, control passes to 1206 where the previous turn ON time is employed.

At 1208, the microcontroller determines whether a new turn OFF time is within an allowed change threshold. The allowed change threshold filters out large changes in times which may result from aberrant conditions. Thus, changes in time that are too large relative to previous turn OFF time(s) may be filtered out. The allowed change threshold may be programmed or provided by the manufacturer or user, or the microcontroller may determine such based on various parameters, for instance sensed parameters such as levels of light or illumination or time or periods between various levels (e.g., length of daylight, length of night). The allowed change threshold may be specific to the turn OFF time or may be employed for other determined times.

If the new turn OFF time is within the allowed change threshold, at 1210 the microcontroller sets the turn OFF time to the new turn OFF time. If not, control passes to 1212 where the previous turn OFF time is employed.

At 1214, the microcontroller determines whether a new decrease time is within an allowed change threshold. The allowed change threshold filters out large changes in times which may result from aberrant conditions. Thus, changes in time that are too large relative to previous decrease time(s) may be filtered out. The allowed change threshold may be programmed or provided by the manufacturer or user, or the microcontroller may determine such based on various parameters, for instance sensed parameters such as levels of light or illumination or time or periods between various levels (e.g., length of daylight, length of night). The allowed change threshold may be specific to the decrease time or may be employed for other determined times.

If the new decrease time is within the allowed change threshold, at 1216 the microcontroller sets the decrease time to the new decrease time. If not, control passes to 1218 where the previous decrease time is employed.

At 1220, the microcontroller determines whether a new increase time is within an allowed change threshold. The allowed change threshold filters out large changes in times which may result from aberrant conditions. Thus, changes in time that are too large relative to previous decrease time(s) may be filtered out. The allowed change threshold may be programmed or provided by the manufacturer or user, or the microcontroller may determine such based on various parameters, for instance sensed parameters such as levels of light or illumination or time or periods between various levels (e.g., length of daylight, length of night). The allowed change threshold may be specific to the increase time or may be employed for other determined times.

If the new decrease time is within the allowed change threshold, at 1222 the microcontroller sets the increase time to the new increase time. If not, control passes to 1224 where the previous increase time is employed.

Figure 13:
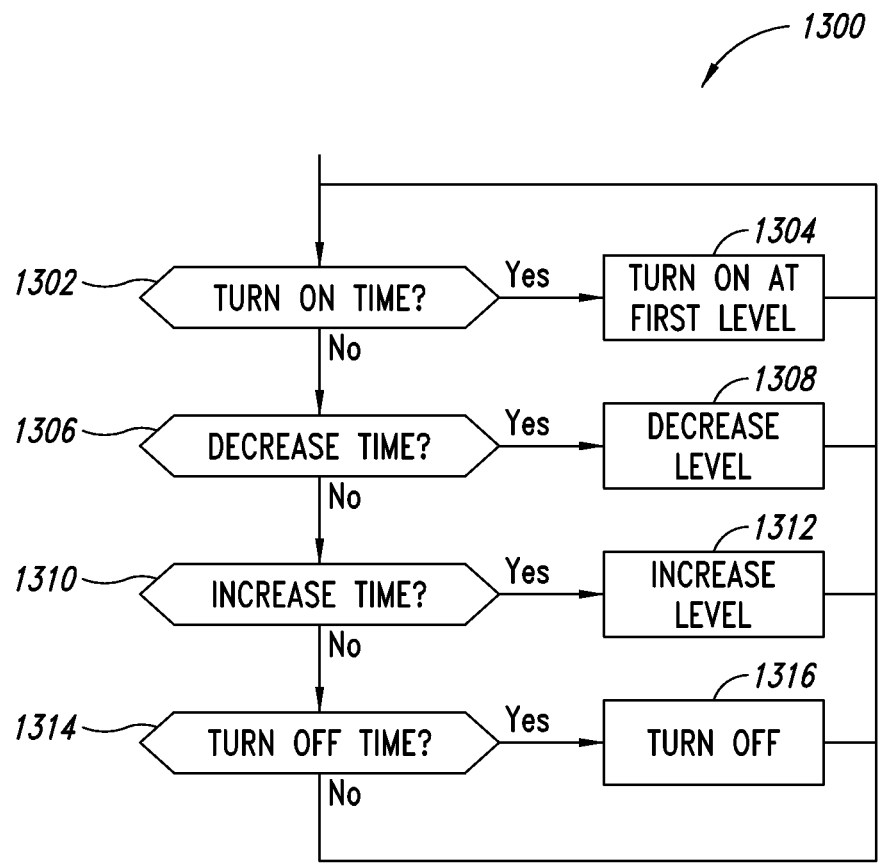
FIG. 13 is a flow diagram showing a low level method of operating a control subsystem to adjust at least one light source according to the occurrence of determined times, according to one non-limiting illustrated embodiment.

FIG. 13 shows a method 1300 of operating a control subsystem to adjust at least one light source according to the occurrence of determined times, according to one non-limiting illustrated embodiment.

At 1302, the microcontroller checks the clock to determine whether the turn ON time for the daily cycle has occurred. If the turn ON time has occurred, the microcontroller turns ON one or more light sources to output a first level of light or illumination at 1304. The first level may be a relatively high level. For example, the microcontroller may turn ON all light sources at full power or intensity. If not, control passes to 1306.

At 1306, the microcontroller checks the clock to determine whether the decrease time for the daily cycle has occurred. If the decrease time has occurred, the microcontroller decreases the output of light or illumination at 1308. If not, control passes to 1310. In particular, depending on the particular type of light source, the control subsystem may reduce a voltage, current, or duty cycle of the electrical power via any variety of electrical or electronic circuitry (e.g., rheostat, DC/DC converter, other power regulator, lamp controller). Alternatively, or additionally, the control subsystem may turn OFF one or more distinct light emitters of the light source from an ON state, to decrease the cumulative level of light by decreasing a total number of light emitters in the ON state.

At 1310, the microcontroller checks the clock to determine whether an increase time for the daily cycle has occurred. If the increase time has occurred, the microcontroller increases the output of light or illumination at 1312. If not, control passes to 1314. In particular, depending on the particular type of light source, the control mechanism, retrofit or integral control subsystem may increase a voltage, current, or duty cycle of the electrical power via any variety of electrical or electronic circuitry (e.g., rheostat, DC/DC converter, lamp controller, dimmer). Alternatively, or additionally, one or more distinct light emitters of the light source may be turned ON from an OFF state, to increase the level of light by increasing the total number of light emitters in the ON state.

At 1314, the microcontroller checks the clock to determine whether the turn OFF time for the daily cycle has occurred. If the turn OFF time has occurred, the microcontroller turns OFF the light source(s) at 1316.

The method 1300 may terminate until called again by another method or routine. Alternatively, the method 1300 may be executed continuously as a separate thread of a multithreaded process executed by the microcontroller.

While illustrated as testing for each of four times (i.e., ON time, decrease time, increase time, OFF time), the microcontroller may not perform each test in each pass or cycle of the method 1300. For example, once the light source(s) has been turned ON, a state flag may be set which allows the microcontroller to skip or omit performing acts 1302 and 1304 until the state flag is reset. The state flag may be reset, for example, in response to performing act 1316. Likewise, respective state flags may be used to allow the microcontroller to skip or omit other acts, for example to avoid acts 1314 and 1316 if the light source(s) has not been turned ON in the particular daily cycle. The microcontroller may also omit acts 1306, 1308, 1310, and 1312 where no adjustment is made between turning the light sources ON and OFF. Such may not provide as efficient energy usage as might otherwise be possible.

In the various methods discussed above with reference to FIGS. 6-13, the control subsystem may effectively filter aberrant conditions, such as the appearance or disappearance of artificial light from the environment. Thus, the control subsystem may filter out an event where a sensor detects artificial light (e.g., from a passing vehicle or some other source) that is sufficiently bright to exceed previously sensed levels and/or based on that event occurring too soon or too late in a daily cycle. The control subsystem may ignore samples where the signal indicates a sensed level of light that exceeds and/or falls below some threshold level of light. The threshold level of light may be the same or similar to the turn ON and/or turn OFF thresholds. Likewise, the control subsystem may ignore samples where timing of the event in the current daily cycle is outside of a defined threshold of the average or median time period. The control subsystem may discard or ignore levels and logically associated times for any such events. Such may consist of not storing corresponding information to the nonvolatile storage media. Such may additionally or alternatively include adjusting or not adjusting a pointer to a location in nonvolatile storage media, accordingly, or otherwise omitting such information from the determination of any average or median.

Additionally, or alternatively, the control subsystem may set a condition flag to indicate that an aberrant condition was detected. The condition flag may cause the control subsystem to enter a teaching or training cycle during the next daily cycle.

The control subsystem may perform a teaching or training cycle on initially starting up the retrofit or integral control subsystem for the first time or after a period of disuse. Additionally, or alternatively, the control subsystem may perform a teaching or training cycle from time to time, for instance in response to detection of an aberrant condition. The teaching or training cycle may take place over a single daily cycle or over two or more daily cycles.

At various times during a daily cycle the integral control subsystem determines levels of light or illumination sensed in the environment. The control subsystem stores information indicative of the determined amount of time to the nonvolatile storage media. The control subsystem may repeat the determining and storing until some defined number of samples have been stored to the nonvolatile storage media. During the teaching or training cycle, the control subsystem may maintain the level of light output by the light source at a constant level (e.g., relatively high). Such ensures that adequate light is provided at all hours that the light source is ON, until sufficient samples are acquired to reliably predict how long after turn ON the light source will be turned OFF, or the level of light or illumination output by the light source reduced and/or increased. Alternatively, the control subsystem may employ a defined limited duration for the reduced level of light, until sufficient samples are acquired. Such duration should be set conservatively, to not be longer (e.g., 1 hour) than what can safely be anticipated as the period when reduced light levels are acceptable.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, "luminaire" is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 314 may be programmable and may include one or more input ports (not illustrated) through which a user can program the microcontroller 314. For example, the time delays and the various illumination levels of the light source may be programmed. The input port may include switches and/or potentiometers that can be set to program the microcontroller 314. Alternatively, the input port may include an electrical interface for the user to remotely program the microcontroller 314 whether through a wire or wirelessly. In one embodiment, the input port may be the ambient light sensor which is connected to the microcontroller 314. In one embodiment, the microcontroller 314 is programmable optically via one or more images captured by an image capture device or imager (not illustrated). In one embodiment, printed barcode pages are used to set delay times and other parameters used by the microcontroller 314. The microcontroller 314 may also receive a one-bit input via the input port to activate or deactivate the light source. For example, a binary bit of "0" turns OFF the light source 104 and a binary bit of "1" turns ON the light source.

Also for example, the control subsystem 312 may further include a communication device (not illustrated). The communication device may be communicatively coupled to the microcontroller 314. The communication device may be further coupled to an external data network using protocols in compliance with any or all of the Ethernet, the RS-485 and wireless communication standards, such as the IEEE 802.11 standards for example, or commercially or proprietary power line carrier control standards. The communication device may be used to remotely program the microcontroller 314. Alternatively, the communication device may be used to transmit information from the control subsystem 312 to a remote user or processor based system. For example, the communication device may be used to transmit a notification signal from the microcontroller 314 indicative of turning ON, turning OFF, increasing or decreasing output from a light source. The communication device may be used to transmit an actuation signal from the microcontroller 314 to actuate a device such as an alarm or an automatic door.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Patent Publication No. US 2009/0278474, published Nov. 12, 2009; U.S. Patent Publication No. US 2009/0284155, published Nov. 19, 2009; U.S. Patent Publication No. US 2010/0090577, published Apr. 15, 2010; U.S. Provisional Patent Application No. 61/051,619 filed May 8, 2008; U.S. Provisional Patent Application No. 61/052,924 filed May 13, 2008; U.S. Provisional Patent Application No. 61/088,651 filed Aug. 13, 2008; U.S. Provisional Patent Application No. 61/115,438 filed Nov. 17, 2008; U.S. Provisional Patent Application No. 61/154,619 filed Feb. 23, 2009; U.S. Provisional Patent Application No.

61/174,913 filed May 1, 2009; U.S. Provisional Patent Application No. 61/180,017 filed May 20, 2009; U.S. Provisional Patent Application No. 61/229,435 filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Nonprovisional patent application Ser. No. 12/784,091, filed May 20, 2010 entitled "APPARATUS AND METHOD OF ENERGY EFFICIENT ILLUMINATION"; and U.S. Provisional Patent Application Ser. No. 61/346,263, filed May 19, 2010, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of operating an illumination system, the method comprising:
   processing by at least one control subsystem information indicative of a number of levels of illumination in an environment sensed by at least one sensor at respective ones of a plurality of times during each of a plurality of daily cycles; the processing by the at least one control subsystem including:
      correlating at least one solar time with a clock of the control subsystem, the at least one solar time based at least in part on the information sensed by the at least one sensor and indicative of at least one of: a maximum level of illumination indicative of solar noon or a minimum level of illumination indicative of solar midnight over at least one previous one of the plurality of the daily cycles which occurred prior to a current one of the plurality of daily cycles;
      determining at least one illumination adjustment time with reference to the clock of the control subsystem at which to adjust a level of illumination produced by at least one illumination source during a current one of the plurality of daily cycles; and
      adjusting the level of illumination produced by the least one illumination source responsive to the occurrence of the determined at least one illumination adjustment time as indicated by the clock of the control subsystem.

2. The method of claim 1 wherein correlating at least one solar time with a clock of the control subsystem includes storing a number of values indicative of respective levels of illumination to at least one nonvolatile storage medium with a respective logical relationship to a respective time with reference to the clock.

3. A method of operating an illumination system, the method comprising:
   processing by at least one control subsystem information indicative of a number of levels of illumination in an environment sensed by at least one sensor at respective ones of a plurality of times during each of a plurality of daily cycles; the processing by the at least one control subsystem including:
      correlating at least one solar time with a clock of the control subsystem, the at least one solar time based at least in part on the information sensed by the at least one sensor and indicative of at least one of: a rate of change in the illumination levels or a direction of change in the illumination levels for each of the plurality of daily cycles;
      determining at least one illumination adjustment time with reference to the clock of the control subsystem at which to adjust a level of illumination produced by at least one illumination source during a current one of the plurality of daily cycles; and
      adjusting the level of illumination produced by the least one illumination source responsive to the occurrence of the determined at least one illumination adjustment time as indicated by the clock of the control subsystem.

4. The method of claim 1 wherein determining at least one illumination adjustment time with reference to the clock of the control subsystem includes determining at least one of a time of dusk or a time of dawn based at least in part on at least one level of illumination.

5. The method of claim 1 wherein determining at least one illumination adjustment time with reference to the clock of the control subsystem includes determining at least one of a time of dusk or a time of dawn based on a percentage of at least one illumination level associated with an event in the daily cycle.

6. The method of claim 5 wherein the event in the daily cycle associated with the illumination level upon which the at least one of the time of dusk or the time of dawn is based includes at least one of a minimum illumination level, a maximum illumination level, a minimum rate of change in illumination level, a maximum rate of change of illumination level, a change in direction from increasing illumination level to decreasing illumination level or a change in direction from decreasing illumination level to increasing illumination level.

7. The method of claim 5 wherein determining at least one illumination adjustment time with reference to the clock of the control subsystem further includes limiting a change in at least one of a time of dusk or time of dawn in a current one of the daily cycles from a determined time of dusk or time of dawn from at least one previous one of the daily cycles based at least in part on a defined permitted value.

8. The method of claim 1 wherein the information indicative of the levels of illumination is stored in at least one nonvolatile storage medium and determining at least one illumination adjustment time with reference to the clock of the control subsystem includes filtering out information corresponding to a short term event from the information based on at least one threshold value that specifies a minimum duration.

9. The method of claim 1 wherein adjusting a level of illumination includes at least one of:
   causing at least one illumination source to be turned ON at a first illumination level during a current one of the daily cycles; or
   causing at least one illumination source to be turned OFF during the current one of the daily cycles.

10. The method of claim 9 wherein adjusting a level of illumination includes at least one of:
   causing a level of illumination produced by the at least one illumination source to be reduced from the first level to a non-zero level between the at least one illumination source being turned ON and OFF during the current one of the daily cycles; or causing the level of illumination produced by the at least one illumination source to be increased between the causing the level of illumination produced by the at least one illumination source to be reduced and the at least one illumination source being turned OFF during the current one of the daily cycles.

11. An illumination system, the illumination system comprising:
a control subsystem that includes at least one control circuit, the control subsystem communicatively coupled to receive information indicative of a number of levels of illumination in an environment sensed by at least one sensor at respective ones of a plurality of times during each of a plurality of daily cycles, and that:
correlates at least one solar time with a clock of the control subsystem, the at least one solar time based at least in part on the information indicative of the level of illumination in the environment sensed by the at least one sensor;
determines at least one illumination adjustment time with reference to the clock of the control subsystem at which to adjust a level of illumination produced by at least one illumination source during a current one of the plurality of daily cycles; and
adjusts the level of illumination produced by the least one illumination source responsive to the occurrence of the determined at least one illumination adjustment time as indicated by the clock of the control subsystem; and
an analog timer circuit that produces at least a first control signal at a first defined period following an occurrence of a first time as indicated by the clock of the control subsystem.

12. The illumination system of claim 11 wherein the control subsystem stores a number of values indicative of respective levels of illumination to at least one nonvolatile storage medium with a respective logical relationship to a respective time with reference to the clock to correlate the at least one solar time with the clock.

13. The illumination system of claim 11 wherein the control subsystem determines a time with reference to the clock of an occurrence of at least one of a maximum level of illumination indicative of solar noon or a minimum level of illumination indicative of solar midnight over at least one previous one of the plurality of the daily cycles which occurred prior to a current one of the plurality of daily cycles to correlate the at least one solar time with the a clock.

14. The illumination system of claim 11 wherein the control subsystem determines at least one of a rate of change in the illumination levels and a direction of change in the illumination levels for each of the plurality of daily cycles to correlate the at least one solar time with the clock.

15. The illumination system of claim 11 wherein the control subsystem determines at least one of a time of dusk or a time of dawn based at least in part on at least one level of illumination to determine the at least one illumination adjustment time.

16. The illumination system of claim 11 wherein the control subsystem determines at least one of a time of dusk or a time of dawn based on a percentage of at least one illumination level associated with an event in the daily cycle to determine the at least one illumination adjustment time.

17. The illumination system of claim 16 wherein the event in the daily cycle associated with the illumination level upon which the at least one of the time of dusk or the time of dawn is based includes at least one of a minimum illumination level, a maximum illumination level, a minimum rate of change in illumination level, a maximum rate of change of illumination level, a change in direction from increasing illumination level to decreasing illumination level or a change in direction from decreasing illumination level to increasing illumination level.

18. The illumination system of claim 16 wherein the control subsystem further limits a change in at least one of a time of dusk or time of dawn in a current one of the daily cycles from a determined time of dusk or time of dawn from at least one previous one of the daily cycles based at least in part on a defined permitted value to determine the at least one illumination adjustment time.

19. The illumination system of claim 13 wherein the control subsystem further includes at least one nonvolatile storage medium that stores the information indicative of the levels of illumination and the control subsystem filters out information corresponding to a short term event from the information based on at least one threshold value that specifies a minimum duration to determine the at least one illumination adjustment time.

20. The illumination system of claim 11 wherein the control subsystem:
causes at least one illumination source to be turned ON at a first illumination level during a current one of the daily cycles; and
causes at least one illumination source to be turned OFF during the current one of the daily cycles,
to adjust the level of illumination.

21. The illumination system of claim 11 wherein the control subsystem:
causes a level of illumination produced by the at least one illumination source to be reduced from the first level to a non-zero level between the at least one illumination source being turned ON and OFF during the current one of the daily cycles; and
causes the level of illumination produced by the at least one illumination source to be increased between the causing the level of illumination produced by the at least one illumination source to be reduced and the at least one illumination source being turned OFF during the current one of the daily cycles,
to adjust the level of illumination.

22. The method of claim 3 wherein correlating at least one solar time with a clock of the control subsystem includes storing a number of values indicative of respective levels of illumination to at least one nonvolatile storage medium with a respective logical relationship to a respective time with reference to the clock.

23. The method of claim 3 wherein determining at least one illumination adjustment time with reference to the clock of the control subsystem includes determining at least one of a time of dusk or a time of dawn based at least in part on at least one level of illumination.

24. The method of claim 3 wherein determining at least one illumination adjustment time with reference to the clock of the control subsystem includes determining at least one of a time of dusk or a time of dawn based on a percentage of at least one illumination level associated with an event in the daily cycle.

25. The method of claim 3 wherein adjusting a level of illumination includes at least one of:
causing at least one illumination source to be turned ON at a first illumination level during a current one of the daily cycles; or
causing at least one illumination source to be turned OFF during the current one of the daily cycles.

26. The method of claim 25 wherein adjusting a level of illumination includes at least one of:

causing a level of illumination produced by the at least one illumination source to be reduced from the first level to a non-zero level between the at least one illumination source being turned ON and OFF during the current one of the daily cycles; or causing the level of illumination produced by the at least one illumination source to be increased between the causing the level of illumination produced by the at least one illumination source to be reduced and the at least one illumination source being turned OFF during the current one of the daily cycles.

\* \* \* \* \*

UNITED STATES PATENT AND TRADEMARK OFFICE
CERTIFICATE OF CORRECTION

PATENT NO. : 8,508,137 B2
APPLICATION NO. : 12/784093
DATED : August 13, 2013
INVENTOR(S) : William G. Reed It is certified that error appears in the above-identified patent and that said Letters Patent is hereby corrected as shown below:

In the Claims

Column 27, Line 49, Claim 1:
"adjusting the level of illumination produced by the least" should read, --adjusting the level of illumination produced by the at least--.

Column 28, Line 13, Claim 3:
"adjusting the level of illumination produced by the least" should read, --adjusting the level of illumination produced by the at least--.

Column 29, Line 25, Claim 11:
"adjusts the level of illumination produced by the least" should read, --adjusts the level of illumination produced by the at least--.

Column 29, Line 47, Claim 13:
"to correlate the at least one solar time with the a clock." should read, --to correlate the at least one solar time with the clock.--.

Signed and Sealed this
Eighth Day of April, 2014

Michelle K. Lee
*Deputy Director of the United States Patent and Trademark Office*